(12) United States Patent
Kimura

(10) Patent No.: US 6,549,332 B2
(45) Date of Patent: *Apr. 15, 2003

(54) REFLECTING OPTICAL SYSTEM

(75) Inventor: Kenichi Kimura, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,513

(22) Filed: Feb. 14, 1997

(65) Prior Publication Data
US 2002/0003656 A1 Jan. 10, 2002

(30) Foreign Application Priority Data
Feb. 15, 1996 (JP) .............................. 8-054275

(51) Int. Cl.$^7$ .................. G02B 17/00; G02B 27/14
(52) U.S. Cl. ............... 359/366; 359/407; 359/630; 359/728
(58) Field of Search ............... 359/362–366, 359/726–732, 618, 629–636, 850–871, 831, 837

(56) References Cited

U.S. PATENT DOCUMENTS

| | | | |
|---|---|---|---|
| 3,305,294 A | 2/1967 | Alvarez | 351/169 |
| 3,674,334 A | 7/1972 | Offner | 359/366 |
| 4,249,793 A | 2/1981 | Uehara | 359/676 |
| 4,265,510 A | 5/1981 | Cook | 359/366 |
| 4,650,292 A | 3/1987 | Baker et al. | 359/720 |
| 4,737,021 A | 4/1988 | Korsch | 359/366 |
| 4,744,618 A * | 5/1988 | Mahlein | 359/728 |
| 4,775,217 A | 10/1988 | Ellis | 359/630 |
| 4,796,984 A * | 1/1989 | Wynne | 359/366 |
| 4,812,030 A | 3/1989 | Pinson | 359/859 |
| 4,993,818 A | 2/1991 | Cook | 359/366 |
| 5,042,928 A * | 8/1991 | Richards | 359/728 |
| 5,063,586 A | 11/1991 | Jewell et al. | 378/34 |
| 5,144,476 A | 9/1992 | Kebo | 359/366 |
| 5,148,308 A | 9/1992 | Miyauchi | 359/432 |
| 5,448,411 A | 9/1995 | Morooka | 359/676 |
| 5,452,126 A * | 9/1995 | Johnson | 359/726 |
| 5,453,877 A | 9/1995 | Gerbe et al. | 359/633 |
| 5,517,366 A * | 5/1996 | Togino | 359/366 |
| 5,594,588 A | 1/1997 | Togino | 359/631 |
| 5,638,219 A * | 6/1997 | Puerta et al. | 359/729 |
| 5,663,833 A | 9/1997 | Nanba et al. | 359/631 |
| 5,687,025 A | 11/1997 | Nanba | 359/633 |
| 5,699,194 A * | 12/1997 | Takahashi | 359/630 |
| 5,701,202 A | 12/1997 | Takahashi | 359/631 |
| 5,706,136 A * | 1/1998 | Okuyama et al. | 359/633 |
| 5,726,807 A | 3/1998 | Nakaoka et al. | 359/631 |
| 5,734,505 A | 3/1998 | Togino et al. | 359/631 |
| 6,021,004 A | 2/2000 | Sekita et al. | 359/676 |

FOREIGN PATENT DOCUMENTS

| | | |
|---|---|---|
| JP | 0365406 | 4/1990 |
| JP | 2297516 | 12/1990 |
| JP | 4-40688 | 7/1992 |
| JP | 512704 | 1/1993 |
| JP | 6139612 | 5/1994 |

OTHER PUBLICATIONS

S. Yamazaki et al., "Development of Super Compact HMD with Sight Line Input," Proceedings of 3D Image Conference '95 (Jul. 6, 1995), pp. 70–75 (and translation).

* cited by examiner

Primary Examiner—Thong Nguyen
(74) Attorney, Agent, or Firm—Fitzpatrick, Cella, Harper & Scinto

(57) ABSTRACT

Disclosed is a reflecting optical system in which a beam from an object is incident through an incident surface formed in a surface of a transparent body, the beam is reflected by a reflecting surface of internal reflection comprised of a curved surface provided in a part of the transparent body, and thereafter the beam is emergent from an emergent surface of the transparent body, thereby forming an image, wherein a radius of curvature of the incident surface is set to be nearly equal to a distance from the vertex of the incident surface to the object on a reference axis and wherein a radius of curvature of the emergent surface is set to be nearly equal to a distance from the vertex of the emergent surface to the image on the reference axis.

3 Claims, 17 Drawing Sheets

REFLECTING OPTICAL SYSTEM

BACKGROUND OF THE INVENTION

1. Field of the Invention

The present invention relates to a reflecting optical system and an imaging apparatus using it and, more particularly, to a reflecting optical system suitably applicable to imaging optical systems, observing optical systems, and so on in video cameras and still video cameras for forming an object image on a predetermined surface, using an optical element having a plurality of reflecting surfaces.

2. Related Background Art

A variety of imaging or observing optical systems using a refracting optical system have been proposed heretofore. These optical systems are well corrected for spherical aberration, coma, curvature of field, and so on at a reference wavelength in the visible wavelength region and also corrected similarly for various aberrations at wavelengths other than the reference wavelength. In particular, since a refracting system has so-called dispersion that refractive indices of a material such as glass differ depending upon wavelengths, imaging performance is improved by correction for chromatic aberration occurring because of the dispersion characteristics (which is so called achromatization).

For example, in the case of an optical system using a refracting lens, it is theoretically impossible to effect achromatization as well as the imaging action with a single lens. Therefore, correction for chromatic aberration is done by a combination of plural lenses different in index and dispersion.

On the other hand, there have been a variety of proposals on photographing optical systems using reflecting surfaces such as a concave mirror or a convex mirror. Since the reflecting surfaces theoretically cause no chromatic aberration, such photographing optical systems are often applied to telescopes the imaging performance of which is very susceptible to chromatic aberration.

FIG. 17 is a schematic view of a so-called mirror optical system comprised of a concave mirror and a convex mirror. In the mirror optical system of the same drawing, an object beam 104 from an object is reflected by the concave mirror 101 then travels toward the object, is converged and then is reflected by the convex mirror 102 to form an image on the image plane 103 thereafter. Reference numeral 105 is a reference axis.

This mirror optical system has the basic configuration of the so-called Cassegrainian reflecting telescope, which reduces the total length of optical system by folding an optical path of a telephoto lens system with a long total lens length comprised of refracting lenses by two opposite reflecting mirrors and which avoids chromatic aberration specific to the telephoto lens by using the mirror optical system.

In this way, in the photographing lenses with longer total lens lengths, the reflecting mirrors are conventionally used instead of the lenses to fold the optical path efficiently, thereby obtaining the mirror optical system compact and free of chromatic aberration. In a so-called catoptric optical system using only the reflecting system, it is, however, difficult to correct all aberrations occurring at the reflecting mirrors by the limited number of surfaces or in a limited space.

There are thus examples of advantageously combining the reflecting system with the refracting system to increase degrees of freedom and thereby to correct aberrations as a total system. FIG. 18 shows an example of a so-called catadioptric system as a combination of the reflecting system with the refracting system. In FIG. 18, an object beam 116 from an object is subject to refraction in refracting lenses 111, 112, thereafter is reflected by a concave mirror 113, then travels toward the object as being converged, thereafter is reflected by a convex mirror 114, and then forms an image on the image plane 115. The refracting lens system is constructed so as to correct aberration occurring at the reflecting mirrors.

However, the refracting system is the combination of the convex lens 111 with the concave lens 112 in order to suppress chromatic aberration. Although the optical path is folded efficiently by only the reflecting system to achieve the compact arrangement, it has a disadvantage of an increase of size because it requires refracting lenses with a large aperture in fact.

In addition, because of an increase in the number of components, it was necessary to assemble the respective optical components with high accuracy in order to attain necessary optional performance. In particular, because high accuracy is required for the relative position between the reflecting mirrors or for the relative position between the reflecting mirrors and the refracting lenses, adjustment of position and angle of each reflecting mirror was essential.

Proposed as a method for solving this problem is a method for forming the mirror system in a block, thereby avoiding assembling errors of the optical components caused upon assembling, for example.

Conventional examples of such elements incorporating many reflecting surfaces in a block include optical prisms such as a pentagonal roof prism or a Porro prism used in a finder system or the like, for example.

Since these prisms include a plurality of reflecting surfaces integrally formed, they are formed with high accuracy for the relation of relative position among the reflecting surfaces, which obviates a need for positional adjustment between the reflecting surfaces. In many cases, however, the principal function of these prisms is to change the traveling direction of light rays so as to invert the image and the reflecting surfaces are often flat.

In contrast with the foregoing, there are known optical systems with the reflecting surfaces of prism having curvature.

FIG. 19 is a schematic drawing of the major part of the observing optical system disclosed in the specification of U.S. Pat. No. 4,775,217. This observing optical system is an optical system for observing a view in the external field and for observing a display image displayed on an information display as overlapping the view.

In this observing optical system, a display beam 125 emitted from the display image on the information display 121 is reflected by a surface 122 to travel toward the object and then to enter a halfmirror surface 123 being a concave surface. After being reflected by this halfmirror surface 123, the display beam 125 is changed to a nearly parallel beam by refracting power of the concave surface 123, then is refracted and transmitted by the surface 122, and forms an enlarged, virtual image of the display image as entering the pupil 124 of an observer. Thus the observer can visually recognize the display image.

On the other hand, the object beam 126 from an object is incident to a surface 127 nearly parallel to the reflecting surface 122 to be refracted and then to reach the halfmirror surface 123 of concave surface. A semi-transparent film is evaporated over the concave surface 123. Thus, part of the object beam 126 passes through the concave surface 123, then is refracted and transmitted by the surface 122, and thereafter enters the observer's pupil 124. By this, the observer visually recognizes the display image overlapping the view of the external field.

FIG. 20 is a schematic drawing of the major part of the observing optical system disclosed in Japanese Patent Application Laid-open No. 2-297516. This observing optical system is also an optical system for observing the view in the external field and for observing the display image displayed on the information display as overlapping the external view.

In this observing optical system, the display beam 134 emitted from the information display 130 passes through a flat surface 137 forming the prism Pa to enter the prism Pa and then to be incident to a parabolic reflecting surface 131. The display beam 134 is reflected by this reflecting surface 131 to become a converging beam to form an image on the focal plane 136. The display beam 134 reflected by the reflecting surface 131 at this time is totally reflected between the two parallel flat surfaces 137 and 138 constituting the prism Pa and then reaches the focal plane 136, thereby achieving reduction of the thickness of the total optical system.

Then the display beam 134 emerging as diverging light from the focal plane 136 is totally reflected between the flat surface 137 and the flat surface 138 and then is incident to a halfmirror 132 of a parabolic surface. The display beam is reflected by the halfmirror surface 132 to form an enlarged, virtual image of the display image by the refracting power thereof and to become a nearly parallel beam. The parallel beam passes through the surface 137 to enter the observer's pupil 133, thereby permitting the observer to recognize the display image.

On the other hand, the object beam 135 from the external field passes through a surface 138b forming the prism Pb and then passes through the halfmirror 132 of the parabolic surface. Then the object beam 135 passes through the surface 137 to enter the observer's pupil 133. The observer visually recognizes the display image overlapping the view of the external field. Further, there are examples applying an optical element to the reflecting surface of prism, for example, the optical heads for optical pickup disclosed in Japanese Patent Application Laid-open No. 5-12704, No. 6-139612, and so on. These are arranged so that light from a semiconductor laser is reflected by a Fresnel surface or a hologram surface and thereafter is focused on a disk surface and that reflected light from the disk is guided to a detector.

In the optical systems with many reflecting surfaces formed in a block as described above, however, aberration correction is not done by positively constructing the catadioptric system in a block and they thus have a problem of chromatic aberration occurring at the incident and emergent surfaces because the block is made of a medium of glass or the like having the dispersion characteristics, in particular.

The prime object of the both observing optical systems disclosed in the specification of U.S. Pat. No. 4,775,217 and in the bulletin of Japanese Patent Application Laid-open No. 2-297516 as described above is the pupil imaging action and change of traveling direction of ray for efficiently transmitting the display image displayed on the information display located away from the observer's pupil thereto, but they directly disclose nothing about the technology for positively correcting aberration by the reflecting surface with curvature.

In addition, aberration correction of the entire system is not made by positively combining the reflecting system with the refracting system, and especially, nothing is directly disclosed as to the technology for correction for chromatic aberration occurring at the incident and emergent surfaces.

Further, the optical systems for optical pickup disclosed in the bulletin of Japanese Patent Application Laid-open No. 5-12704, the bulletin of Japanese Patent Application Laid-open No. 6-139612, and so on are limited to applications to a detecting optical system, and especially, they do not satisfy the imaging performance for the imaging apparatus using an area type image pickup device such as a CCD. Further, the operation wavelength band is extremely narrow and chromatic aberration is not corrected for over the visible light region, different from the photographing optical system.

SUMMARY OF THE INVENTION

An object of the present invention is to provide a reflecting optical system arranged in such a manner that, in picking up an image using an optical element obtained by integrally forming a plurality of internal reflecting surfaces of curved or flat surfaces in a transparent body, the various aberrations of the total system is well corrected for by properly setting curvature of the incident surface or/and emergent surface of the optical element and the object position or/and image position thereof, especially chromatic aberration is corrected for at a high level, thereby improving the imaging performance, and also to provide an imaging apparatus using the reflecting optical system.

The reflecting optical system of the present invention is:

(1-1) a reflecting optical system arranged in such a manner that a beam from an object is incident into an incident surface formed in a surface of a transparent body, then is reflected by a reflecting surface of internal reflection comprised of a curved surface provided in a part of the transparent body, and thereafter emerges from an emergent surface of the transparent body, which is characterized in that a radius of curvature of the incident surface is set to be nearly equal to a distance from a vertex of the incident surface to the object on a reference axis.

Especially, the reflecting optical system is characterized in that:

(1-1-1) the reflecting surface is decentered relative to the incident surface;

(1-1-2) the beam forms an intermediate image inside the transparent body;

(1-1-3) the center of curvature of the incident surface is set on the object side with respect to the incident surface;

(1-1-4) the aforementioned object is an image formed on the light exit side of the incident surface by another optical system and the incident surface is a convex surface; or (1-1-5) the aforementioned object is an image formed on the light entrance side of the incident surface by another optical system and the incident surface is a concave surface.

Further, the reflecting optical system of the present invention is:

(1-2) a reflecting optical system arranged in such a manner that a beam from an object is incident into an incident surface formed in a surface of a transparent body, then is reflected by a reflecting surface of internal reflection comprised of a curved surface provided in a part of the transparent body, and thereafter emerges from an emergent surface of the transparent body to form an image, which is characterized in that a radius of curvature of the emergent surface is set to be nearly equal to a distance from a vertex of the emergent surface to the image on a reference axis.

Especially, the reflecting optical system is characterized in that:

(1-2-1) the reflecting surface is decentered relative to the incident surface;

(1-2-2) the beam forms an intermediate image inside the transparent body;

(1-2-3) the center of curvature of the emergent surface is set on the image side with respect to the emergent surface;

(1-2-4) the emergent surface is a concave surface and the aforementioned image is formed on the light exit side of the emergent surface; or (1-2-5) the emergent surface is a convex surface and the aforementioned image is formed on the light entrance side of the emergent surface.

DETAILED DESCRIPTION OF THE PREFERRED EMBODIMENTS

The principle of correction for chromatic aberration according to the present invention is first described with reference to FIG. 2 and FIG. 3. The present invention effectively achieves correction for chromatic aberration occurring at the incident surface and emergent surface in an optical element block made of a same medium. Thus, consideration is first focused on chromatic aberration itself.

Figure 2:
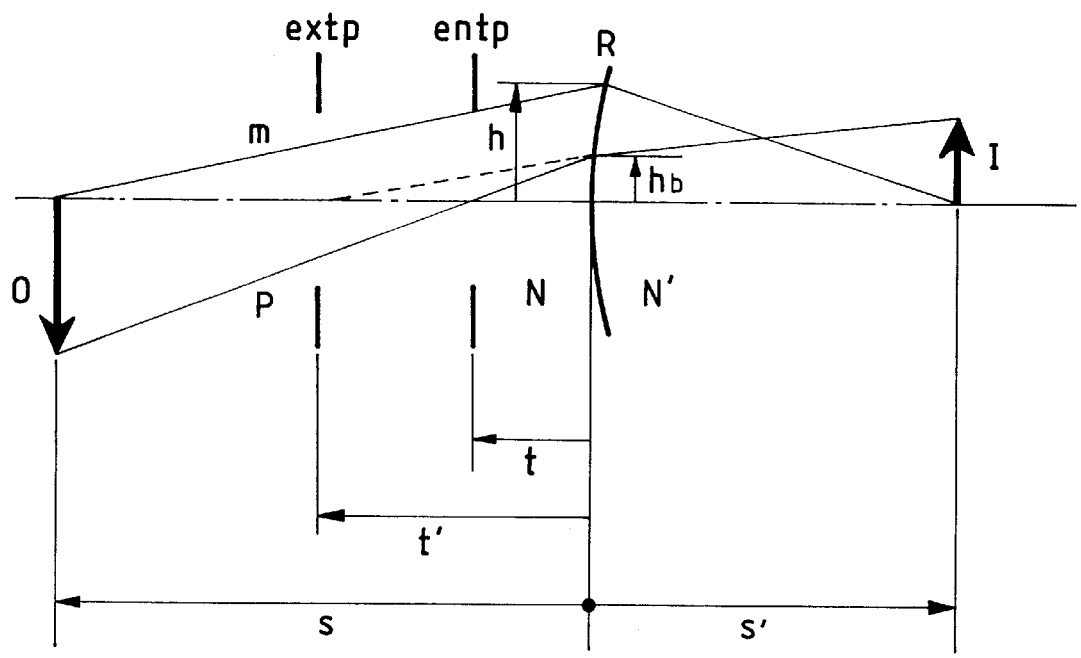
FIG. 2 is an explanatory drawing to illustrate the principle of the present invention with a refracting surface.

FIG. 2 is an explanatory drawing to illustrate image formation of object O by a refracting surface R. In the drawing the chain line represents the optical axis and the object O is placed at a distance s from the refracting surface R. The image I is formed at a distance s' from the refracting surface R. The entrance pupil entp is located at a distance t from the refracting surface R and the exit pupil extp is formed at a distance t' from the refracting surface R. Refractive indices of media before and after the refracting surface R are N, N', respectively.

By first tracing two paraxial rays m (axial ray) and p (off-axial, principal ray), heights thereof on the refracting surface R are defined as h and $h_b$, respectively. Rays travel from left to right in the drawing and the direction of advance of ray is positive. At this time, supposing the surface R is a spherical surface and a radius of curvature thereof is r (which is positive if the center of curvature is right of the vertex of surface), chromatic aberration occurring thereat can be expressed as follows using coefficients of chromatic aberration, for example according to "Lens designing method" by Yoshiya MATSUI.

Axial chromatic aberration coefficient:

$$L = h \cdot h \cdot N \cdot (1/r - 1/s) \cdot (dN'/N' - dN/N)$$

Lateral chromatic aberration coefficient:

$$T = h \cdot h_b \cdot N \cdot (1/r - 1/t) \cdot (dN'/N' - dN/N) \tag{1}$$

In the above equations, dN and dN' are deviations of refractive indices of the media before and after the surface, respectively, at a wavelength for calculation of chromatic aberration from those at the reference wavelength.

Figure 3:
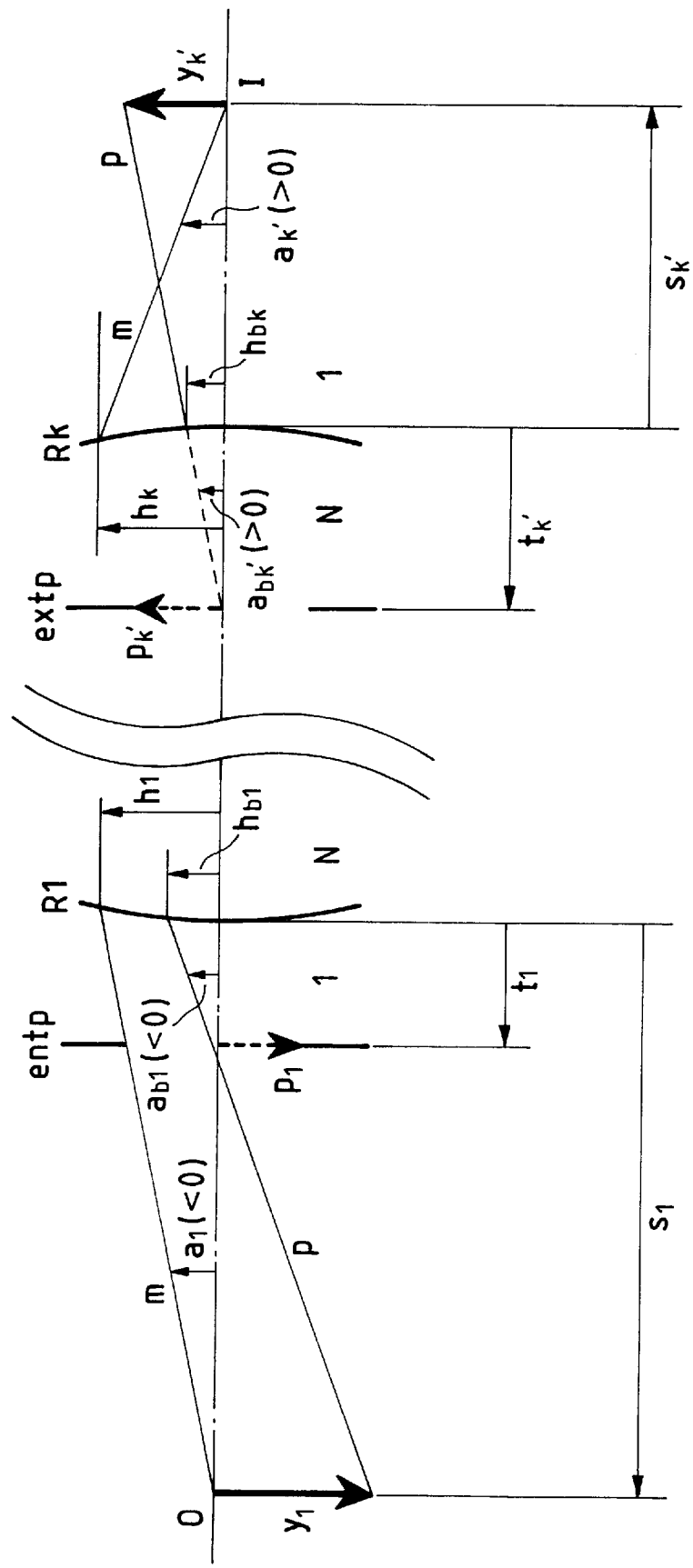
FIG. 3 is an explanatory drawing to illustrate the principle of the present invention with two refracting surfaces.

Now, let us apply the same calculation to an optical element block made of a same medium as shown in FIG. 3. Let us consider an optical system made of a medium of index N and comprised of the incident surface Rl and the emergent surface Rk on the optical axis of the optical system represented by the chain line as shown in FIG. 3. First suppose that the entrance pupil entp is located at a distance $t_l$ from the surface Rl and the exit pupil extp corresponding thereto is formed at a distance $t_k'$ from the emergent surface Rk. We consider image formation of object O located at a distance $s_l$ from the surface Rl. The object O forms the image I at a distance $s_k'$ from the emergent surface Rk after emergence from the optical system.

Two paraxial rays m (axial ray) and p (off-axial, principal ray) are traced. The axial ray m is supposed to be incident at a reduced inclination angle $a_l$ (<0) and a height $h_l$ to the surface Rl and to be emergent at a reduced inclination angle $a_k'$ (>0) and a height $h_k$ from the surface Rk while the off-axial principal ray p is supposed to be incident at a reduced inclination angle $a_{bl}$ (<0) and a height $h_{bl}$ to the surface Rl and to be emergent at a reduced inclination angle $a_{bk}'$ (>0) and a height $h_{bk}$ from the surface Rk. At this time, supposing Rl and Rk are spherical surfaces and radii of curvature thereof are $r_l$ and $r_k$, respectively, the chromatic aberration coefficients at the incident surface and emergent surface are as follows.

$$L = h_l \cdot h_l \cdot 1 \cdot (1/r_l - 1/s_l) \cdot (dN/N - 0) + h_k \cdot h_k \cdot N \cdot (1/r_k - 1/s_k) \cdot (0 - dN/N)$$

$$T = h_l \cdot h_{bl} \cdot 1 \cdot (1/r_l - 1/t_l) \cdot (dN/N - 0) + h_k \cdot h_{bk} \cdot N \cdot (1/r_k - 1/t_k) \cdot (0 - dN/N) \quad (2)$$

Here, $s_k$ and $t_k$ are the positions of the image point and exit pupil before refraction by the surface Rk and they may be rewritten as follows by the positions $s_k'$ and $t_k'$ after refraction. From the law of refraction, $$1/s' = N/s + (1-N)/r;$$

$$1/s_k = \{1/s_k' - (1-N)/r_k\} \cdot (1/N).$$

Similarly, $$1/t_k = \{1/t_k' - (1-N)/r_k\} \cdot (1/N).$$

Substituting these into Equation (2), the following equations are obtained.

$$L = \{h_l \cdot h_l (1/r_l - 1/s_l) - h_k \cdot h_k (1/r_k - 1/s_k')\} \cdot (dN/N)$$

$$T = \{h_l \cdot h_{bl} (1/r_l - 1/t_l) - h_k \cdot h_{bk} (1/r_k - 1/t_k')\} \cdot (dN/N)$$

Further rearranging them, the following equations are obtained.

$$L = h_l \cdot h_l \{(1/r_l - 1/s_l) - (h_k/h_l) \cdot (h_k/h_l) \cdot (1/r_k - 1/s_k')\} \cdot (dN/N)$$

$$T = h_l \cdot h_{bl} \{(1/r_l - 1/t_l) - (h_k/h_l) \cdot (h_{bk}/h_{bl}) \cdot (1/r_k - 1/t_k')\} \cdot (dN/N) \quad (3)$$

Here, as seen from FIG. 3, $$h_k/h_l = (s_k' \cdot a_k')/(s_l \cdot a_l) = (s_k'/s_l) \cdot (a_k'/a_l) = s_k'/(s_l \cdot b) \quad (4)$$

Here, $b = a_l/a_k'$ is the image magnification.

Further, let $y_l$ be the size of the object O and $y_k'$ be the size of the image. Considering the imaging relation between the entrance pupil and the exit pupil, their sizes are defined as $p_l$ and $p_k'$, respectively. Considering the Helmholtz-Lagrange invariant between these two imaging relations, the following relation holds.

$$(y_l \cdot p_l)/(s_l - t_l) = (y_k' \cdot p_k')/(s_k' - t_k')$$

Rearranging it, $$(y_l/y_k') \cdot (p_l/p_k') = (s_l - t_l)/(s_k' - t_k')$$

Here, using $y_l/y_k' = 1/b$ and $p_l/p_k' = a_{bk}'/a_{bl}$, $$a_{bk}'/a_{bl} = b \cdot (s_l - t_l)/(s_k' - t_k').$$

Thus, the following equations are obtained.

$$h_{bk}/h_{bl} = (t_k' \cdot a_{bk}')/(t_l \cdot a_{bl})$$
$$= (t_k'/t_l) \cdot (a_{bk}'/a_{bl})$$
$$= b \cdot (t_k'/t_l) \cdot (s_l - t_l)/(s_k' - t_k') \quad (5)$$

$$(h_k/h_l) \cdot (h_{bk}/h_{bl}) = \{b \cdot (t_k'/t_l) \cdot (s_l - t_l)/(s_k' - t_k')\} \cdot \{s_k'/(s_l \cdot b)\}$$
$$= (1/s_l - 1/t_l)/(1/s_k' - 1/t_k')$$

Substituting (4) and (5) each into (3), the following equations are obtained.

$$L = h_l \cdot h_l [(1/r_l - 1/s_l) - \{s_k'/(s_l \cdot b)\} \cdot \{s_k'/(s_l \cdot b)\} \cdot (1/r_k - 1/s_k')] \cdot (dN/N)$$

$$T = h_l \cdot h_{bl} [(1/r_l - 1/t_l) - (1/s_l - 1/t_l)/(1/s_k' - 1/t_k') \cdot (1/r_k - 1/t_k')] \cdot (dN/N) \quad (6)$$

The aberration coefficients indicating the two types of chromatic aberration can be obtained from these equations.

Further, if the optical element block is the first block when counted from the object point, the following initial values of ray tracing can be applied:

$$h_l = s_l \cdot b$$

$$h_{bl} = -t_l/\{(s_l - t_l) \cdot b\}.$$

Thus, Equation (6) can also be expressed as follows.

$$L = [(s_l \cdot b)^2 \cdot (1/r_l - 1/s_l) - (s_k')^2 \cdot (1/r_k - 1/s_k')] \cdot (dN/N)$$

$$T = [(1/r_l - 1/t_l)/(1/s_l - 1/t_l) - (1/r_k - 1/t_k')/(1/s_k' - 1/t_k')] \cdot (dN/N) \quad (7)$$

It is seen from Equation (6) or Equation (7) that in order to reduce chromatic aberration, it is effective on the entrance side to make the radius $r_l$ of curvature of the incident surface Rl nearly equal to the distance $s_l$ on the optical axis from the vertex of the incident surface to the object point and on the exit side to make the radius $r_k$ of curvature of the emergent surface Rk nearly equal to the distance $s_k'$ on the optical axis from the vertex of the emergent surface to the image point.

In addition, considering the sign of radius of curvature, the center of curvature of the incident surface Rl and the object point O should be on the same side with respect to the incident surface from Equation (7). Similarly, the center of curvature of the emergent surface Rk and the image point I should be on the same side with respect to the emergent surface.

Further, for completely correcting for chromatic aberration, $$L = T = 0$$

is necessary in Equations (6) and (7), regardless of $h_l$, $h_{bl}$, and $dN/N$. Thus, the inside of the respective brackets in the equations needs to be zero as follows.

$$(1/r_l - 1/s_l) - \{s_k'/(s_l \cdot b)\} \cdot \{s_k'/(s_l \cdot b)\} \cdot (1/r_k - 1/s_k') = 0 \quad (8)$$

$$(1/r_l - 1/t_l) - (1/s_l - 1/t_l)/(1/s_k' - 1/t_k') \cdot (1/r_k - 1/s_k') = 0 \quad (9)$$

Solving the simultaneous equations of Equations (8) and (9) with respect to $r_l$ and $r_k$, the following conditions are obtained.

$$r_l = s_l \quad (10)$$

$$r_k = s_k' \quad (11)$$

Therefore, necessary conditions for completely correcting for chromatic aberration in the total system of the incident surface and emergent surface are that the radius $r_l$ of curvature of the incident surface Rl is nearly equal to the distance $s_l$ on the optical axis from the vertex of the incident surface to the object point and that the radius $r_k$ of curvature of the emergent surface Rk is nearly equal to the distance $s_k'$ on the optical axis from the vertex of the emergent surface to the image point.

Similarly, considering the sign of radius of curvature, the center of curvature of the incident surface R1 and the object point O need to be on the same side with respect to the incident surface and the center of curvature of the emergent surface Rk and the image point I need to be on the same side with respect to the emergent surface.

Equations (10) and (11) give solutions to make chromatic aberration perfectly zero, but, as seen from Equation (6) or Equation (7), it is sufficient that $(1/r_I-1/s_I)$ or $(1/r_k-1/s_k')$ is small. Thus, the incident surface needs to be a concave surface where the axial rays passing therethrough are a beam of parallel rays or a beam of diverging rays or a convex surface where the axial rays passing therethrough are a beam of parallel rays or a beam of converging rays. Similarly, the emergent surface needs to be a convex surface where the axial rays passing therethrough are a beam of parallel rays or a beam of diverging rays or a concave surface where the axial rays passing therethrough are a beam of parallel rays or a beam of converging rays.

Figure 4:
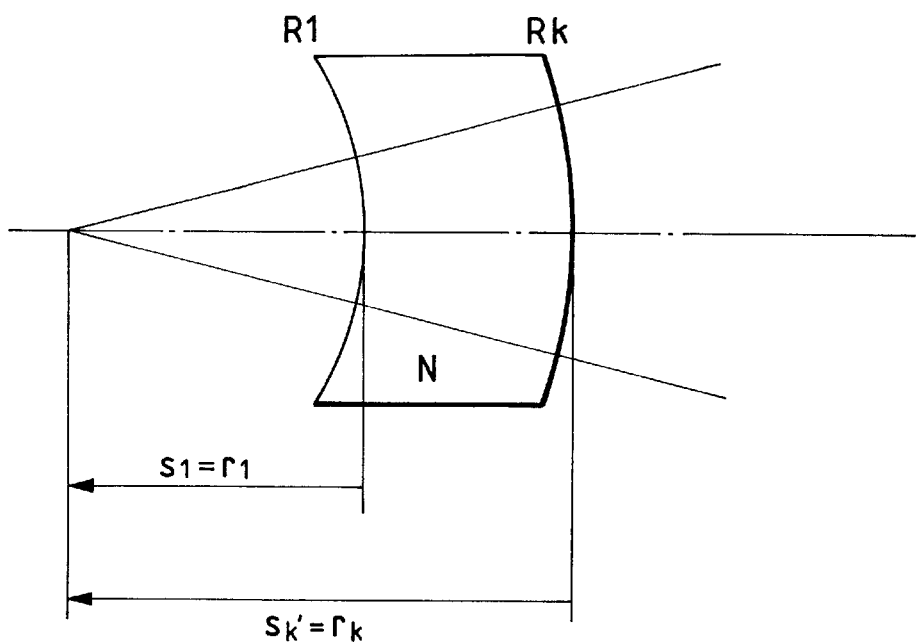
FIG. 4 is an explanatory drawing to illustrate the principle of the present invention with a concentric system.

Applying the above to a practical lens system, for example, a so-called concentric system as shown in FIG. 4, satisfies the above conditions when the common center of curvature is coincident with the object point and the image point. This system, however, is not an image forming system. Therefore, the present invention employs a so-called catadioptric system in which reflecting surfaces of curved surfaces are disposed between the incident and emergent refracting surfaces, thereby obtaining an image forming system to satisfy the above conditions of correction for chromatic aberration by positively combining the reflecting surfaces with the refracting surfaces. Since the reflecting surfaces generate no chromatic aberration theoretically, the present invention employs an optical element in which the incident surface and emergent surface of light and reflecting surfaces of internal reflection comprised of curved surfaces are provided in surfaces of a transparent body.

Figure 1:
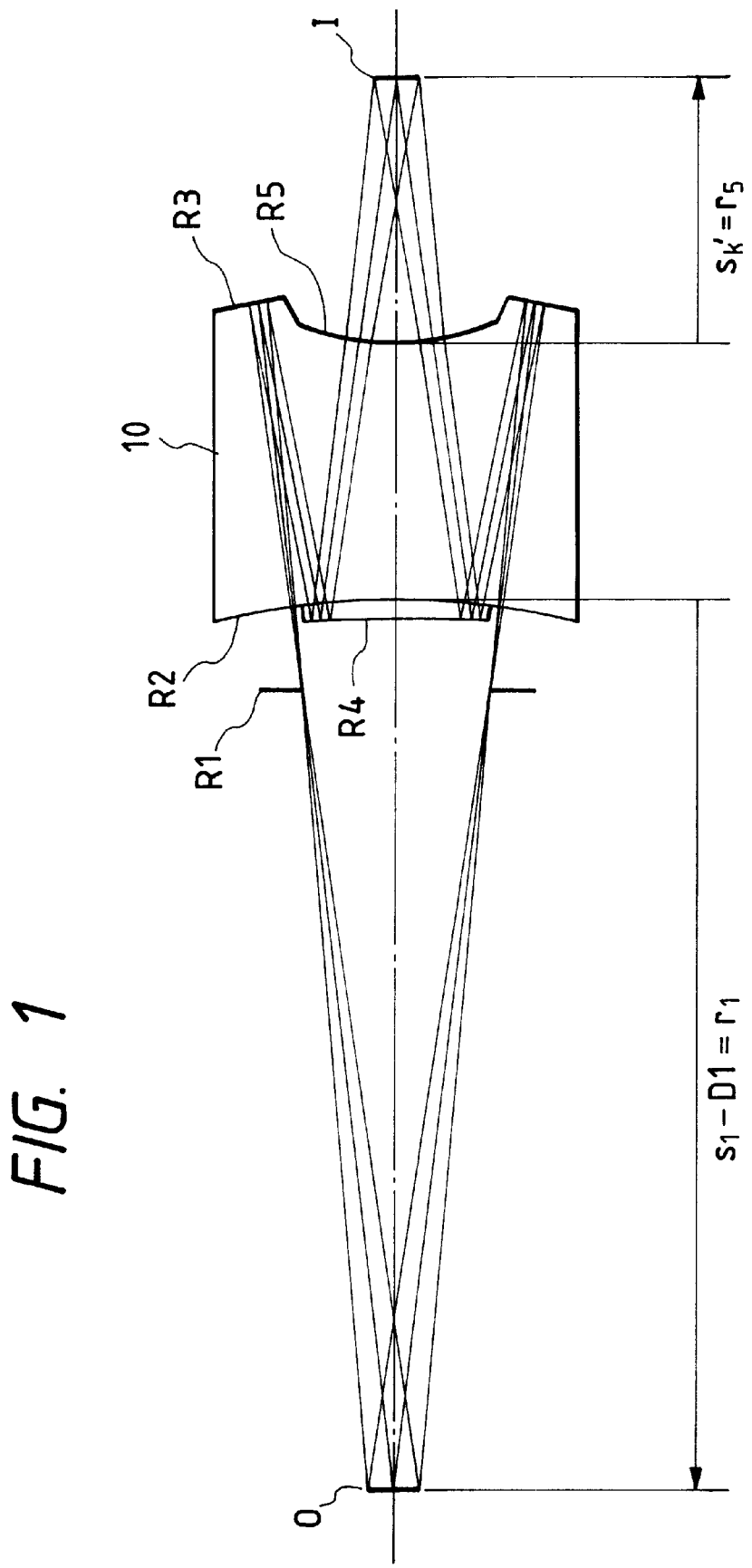
FIG. 1 is a schematic drawing to show the major part of Embodiment 1 of the reflecting optical system according to the present invention.

FIG. 1 is a schematic drawing to show the major part of Embodiment 1 of the reflecting optical system according to the present invention. Constitutional data of the present embodiment will be described below.

Embodiment 1

FIG. 1 is a cross-sectional view of the optical system in Embodiment 1 according to the present invention. FIG. 1 illustrates axial and off-axial rays and optical paths thereof. The constitutional data of the present embodiment is as follows.

| Object distance | −100 mm |
|---|---|
| Image distance | 30 mm |
| Focal length | 39.085 mm |
| Image magnification | 0.846 |

| i | $r_i$ | Di | Ndi | vdi | |
|---|---|---|---|---|---|
| 1 | 0.0 | 10.0 | 1 | | aperture |
| 2 | −100.0 | 35.0 | 1.51633 | 64.15 | |
| 3 | −100.0 | −37.0 | −1.51633 | 64.15 | |
| 4 | −278.36 | 31.0 | 1.51633 | 64.15 | |
| 5 | 30.0 | | 1 | | |

In the above constitutional data, $r_i$ is the radius of curvature of surface Ri, Di is the distance between the i-th surface and the (i+1)-th surface, and Ndi and vdi are the refractive index and Abbe number of the medium between the i-th surface and the (i+1)-th surface.

In the drawing, reference numeral 10 designates a reflecting optical system of the present invention, which is an optical element comprising an aperture stop R1, and the incident surface R2 and emergent surface R5 and two reflecting surfaces R3, R4 formed in surfaces of a transparent body. In FIG. 1, the axial rays from the object point are incident through the concave refracting surface R2, are reflected by the concave mirror R3 of internal reflection, travel toward the object as being converged, are reflected by the convex mirror R4, are emergent from the concave refracting surface R5, and then form an image at the image point I.

The incident surface R2 is a spherical surface with the concave surface faced to the object, the center of curvature thereof is coincident with the object point O, and $r_I=s_I-D1$, thus satisfying Equation (10). On the other hand, the emergent surface R5 is a spherical surface with the concave surface faced to the image, the center of curvature thereof is coincident with the image point I, and $r_5=s_k'$, thus satisfying Equation (11).

Further, the object point O and the center of curvature of the incident surface R2 are located on the same side with respect to the incident surface while the image point I and the center of curvature of the emergent surface R5 on the same side with respect to the emergent surface.

Although FIG. 1 shows image formation of the real object and real image, it is easy to construct an optical element also applicable to the cases of a virtual object (where converging rays are incident to the incident surface) and a virtual image (where diverging rays are emergent from the emergent surface).

Since the optical element of the present embodiment is a coaxial spherical system, the optical axis is the reference axis described hereinafter, and the incident reference axis and emergent reference axis are parallel and are directed in the same direction.

Since the reflecting surfaces and refracting surfaces are coaxially arranged in Embodiment 1, the incident light is eclipsed by the reflecting surface R4, and therefore, the incident light cannot be used effectively. From the same reason, rays from the object point off the optical axis are also likely to be eclipsed, and the present embodiment is not suitable for a photographing system necessitating a wide field angle. It is also difficult on structure to give two or more reflecting surfaces and it is difficult from this aspect to effect high-level correction for aberration.

Thus, the following embodiments are arranged so that reflecting surfaces of curved surfaces are disposed as decentered in the surfaces of the transparent body and the incident surface and emergent surface generate no chromatic aberration.

Described before description of the embodiments are the way of expressing specifications of arrangement of the embodiments and common matters to the whole embodiments.

Figure 5:
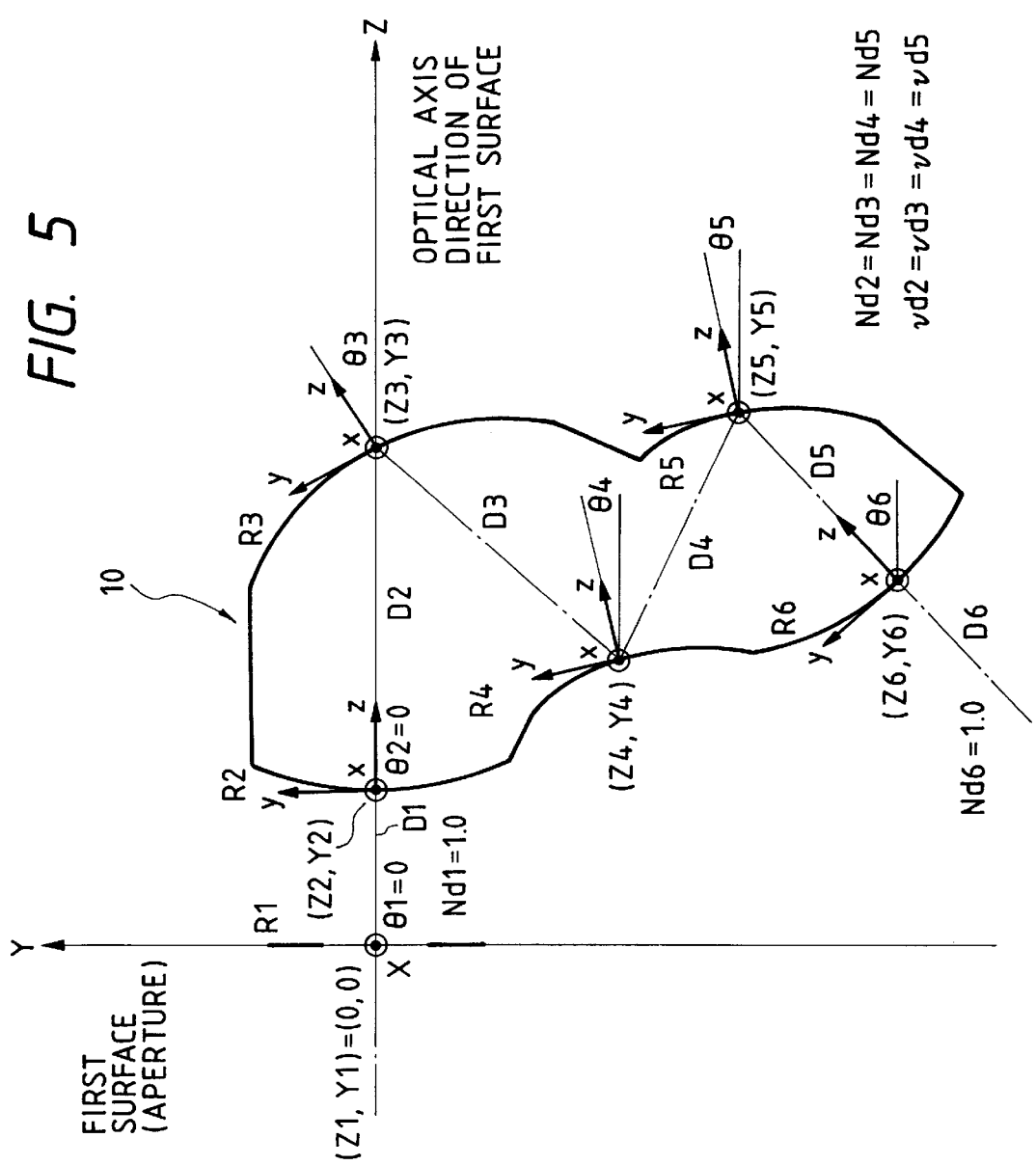
FIG. 5 is an explanatory drawing of the coordinate system in Embodiments 2 to 6 of the present invention.

FIG. 5 is an explanatory drawing of the coordinate system for defining the constitutional data of the optical systems of the following embodiments. In the following embodiments the i-th surface defines the i-th surface along a ray (which is indicated by a chain line in FIG. 5 and which will be called as a reference axis ray) traveling from the object side to the image plane.

In FIG. 5 the first surface R1 is an aperture stop, the second surface R2 is a refracting surface coaxial with the first surface, the third surface R3 is a reflecting surface tilted relative to the second surface R2, the fourth surface R4 and the fifth surface R5 are reflecting surfaces shifted and tilted relative to each preceding surface, and the sixth surface R6 is a refracting surface shifted and tilted relative to the fifth surface R5. The surfaces of from the second surface R2 to the sixth surface R6 are formed on one optical element made of a medium of a glass, a plastic, or the like, which is an optical element 10 in FIG. 5.

Accordingly, in the structure of FIG. 5 the medium from the object plane not shown to the second surface R2 is the air, the medium from the second surface R2 to the sixth surface R6 is a certain common medium, and the medium from the sixth surface R6 to the seventh surface R7 not shown is the air.

Since the optical systems of the following embodiments are decentering optical systems, the surfaces constituting each optical system have no common optical axis. Hence, in the following embodiments an absolute coordinate system is first set with the origin at the center of the ray effective diameter of the first surface.

Then, in the following embodiments, the center point of the ray effective diameter of the first surface is defined as the origin and a path of the ray passing the origin and the center of the final image plane (the reference axis ray) is defined as a reference axis of optical system. Further, the reference axis has its direction in which the reference axis ray travels. When looked from outside of optical system, the reference axis can be handled in the same manner as the conventional optical axis.

Although the reference axis as a reference of optical system was set as described above in the following embodiments, the axis for the reference of optical system may be determined along any axis that is convenient for optical designing, for handling of aberration, or for expressing a configuration of each surface constituting an optical system. However, the reference axis being the reference of optical axis is generally set along a path of a ray passing the center of the image plane and either one of the aperture, the entrance pupil, the exit pupil, and the center of the first surface or the final surface of optical system.

In other words, in the following embodiments, the reference axis is set along the path in which the ray passing the center point of the ray effective diameter of the first surface and reaching the center of the final image plane (the reference axis ray) is refracted and reflected by the respective refracting surfaces and reflecting surfaces. The order of each surface is determined according to the order of refraction or reflection of the reference axis ray.

Accordingly, the reference axis runs as changing its direction in accordance with the law of refraction or reflection in the order of each surface thus set and finally reaches the center of the image plane.

All tilt surfaces constituting the optical system of each of the following embodiments are basically tilted in a same plane. Thus, the axes of the absolute coordinate system are determined as follows.

Z-axis: the reference axis passing the origin and going to the second surface R2

Y-axis: a straight line passing the origin and making 90° counterclockwise relative to the Z-axis in the tilt plane (or in the plane of FIG. 5)

X-axis: a straight line passing the origin and being perpendicular to each of the Z-axis and Y-axis (a straight line normal to the plane of FIG. 5)

In order to express a surface configuration of the i-th surface constituting an optical system, a way of expressing the surface configuration of that surface by a local coordinate system with the origin at an intersecting point between the reference axis and the i-th surface is better for understanding in recognizing the configuration rather than the way of expressing the configuration of that surface by the absolute coordinate system. Therefore, the surface configuration of the i-th surface will be expressed by a local coordinate system in the constitutional data of the following embodiments.

A tilt angle in the YZ plane of the i-th surface will be expressed by an angle $\theta i$ (°), which is positive in the counterclockwise direction, relative to the Z-axis of the absolute coordinate system. Therefore, the origin of a local coordinate system of each surface resides on the YZ plane in FIG. 5 in the following embodiments. No decentration of surface exists in the XZ and XY planes. Further, the y-axis and z-axis of the local coordinate system (x, y, z) of the i-th surface are inclined at angle $\theta i$ in the YZ plane relative to the absolute coordinate system (X, Y, Z) and specifically, the axes are determined as follows.

z-axis: a straight line passing the origin of the local coordinate system and making an angle $\theta i$ counterclockwise in the YZ plane relative to the Z-direction of the absolute coordinate system y-axis: a straight line passing the origin of the local coordinate system and making 90° counterclockwise in the YZ plane relative to the z-direction x-axis: a straight line passing the origin of the local coordinate system and being perpendicular to the YZ plane Di is a scalar quantity indicating a distance between the origins of the local coordinate systems of the i-th surface and the (i+1)-th surface, and Ndi and vdi are refractive index and Abbe number of a medium between the i-th surface and the (i+1)-th surface.

The cross-sectional view and numerical data of optical system will be shown in the following embodiments.

The following embodiments have spherical surfaces and rotationally asymmetric, aspherical surfaces. For the spherical parts among them, the radius $r_i$ of curvature will be given for each spherical configuration. In the numerical data of embodiment, the sign of the radius of curvature $r_i$ is plus when the center of curvature is present on the plus side of the z-axis in the local coordinate system and minus when the center of curvature on the minus side of the z-axis.

Each spherical surface has a shape expressed by the following equation:

$$z = \{(x^2+y^2)/r_i\}/[1+\{1-(x^2+y^2)/r_i^2\}^{1/2}]$$

Each of the following optical systems has at least one aspherical surface rotationally asymmetric and the shape thereof will be expressed by the following equation:

$$z = C_{02} \cdot y^2 + C_{20} \cdot x^2 + C_{03} \cdot y^3 + C_{21} \cdot x^2 \cdot y + C_{04} \cdot y^4 + C_{22} \cdot x^2 \cdot y^2 + C_{40} \cdot x^4.$$

Since the above equation for curved surface includes only even-order terms as to x, curved surfaces defined by the above equation for curved surface have plane-symmetric shapes with respect to the symmetry plane of the yz plane. If the following conditions are further satisfied, curved surfaces will have shapes symmetric with respect to the xz plane.

$$C_{03} = C_{21} = 0$$

If the following conditions are further satisfied, curved surfaces will have rotationally symmetric shapes.

$$C_{02}=C_{20} \text{ and } C_{04}=C_{40}=C_{22}/2$$

When the above conditions are not satisfied, a surface will have a shape being not rotationally symmetric.

In the following embodiments except for Embodiment 4, the first surface R1 is the aperture stop, as shown in FIG. 5. In addition, a horizontal half field angle $u_Y$ is a maximum field angle of a beam incident to the first surface of optical system in the YZ plane in FIG. 5 and a vertical half field angle $u_X$ is a maximum half field angle of a beam incident to the first surface of optical system in the XZ plane. When the first surface is the aperture stop, the diameter thereof will be indicated as an aperture size. This is related to brightness of optical system. In that case, since the entrance pupil is located at the first surface, the above aperture size is equal to the diameter of the entrance pupil.

Additionally, a range of an effective image on the image plane will be indicated as an image size. The image size will be indicated by a rectangular region defined by a horizontal size along the y-direction and a vertical size along the x-direction in the local coordinate system.

Since the optical systems of the following embodiments all are decentering optical systems, it is difficult to directly calculate the focal length based on the paraxial theory. Therefore, a reduced focal length f according to the following definition will be used in the following embodiments:

Reduced focal length $f = h_l / \tan a_k'$ where $h_l$: a height of incidence of a ray incident in parallel with the reference axis in the first surface;

$a_k'$: an angle of the ray relative to the reference axis when the ray is emergent from the final surface.

In each embodiment the following values are given as values of the foregoing conditions of correction for chromatic aberration:

$$E=(1/|r_k|-1/|s_l|) \cdot f$$

$$E'=(1/|r_k|-1/|s_k'|) \cdot f$$

In addition, a transverse aberration diagram is shown for each embodiment if it is accompanied with the constitutional data. A ray aberration diagram includes ray aberration curves of beam at angles of incidence where the horizontal incident angle and vertical incident angle to an optical system are $(u_Y, u_X)$, $(0, u_X)$, $(-u_Y, u_X)$, $(u_Y, 0)$, $(0, 0)$, or $(-u_Y, 0)$, respectively. In the ray aberration diagrams the abscissa represents the height of incidence to the pupil and the ordinate an aberration quantity. Since in each embodiment each surface is basically of a plane-symmetric shape with respect to the symmetry plane of the yz plane, the plus and minus directions of vertical field angle are also the same in the ray aberration diagrams and thus, for simplification of illustration, the ray aberration diagrams in the minus direction will be omitted.

Embodiment 2

Figure 6:
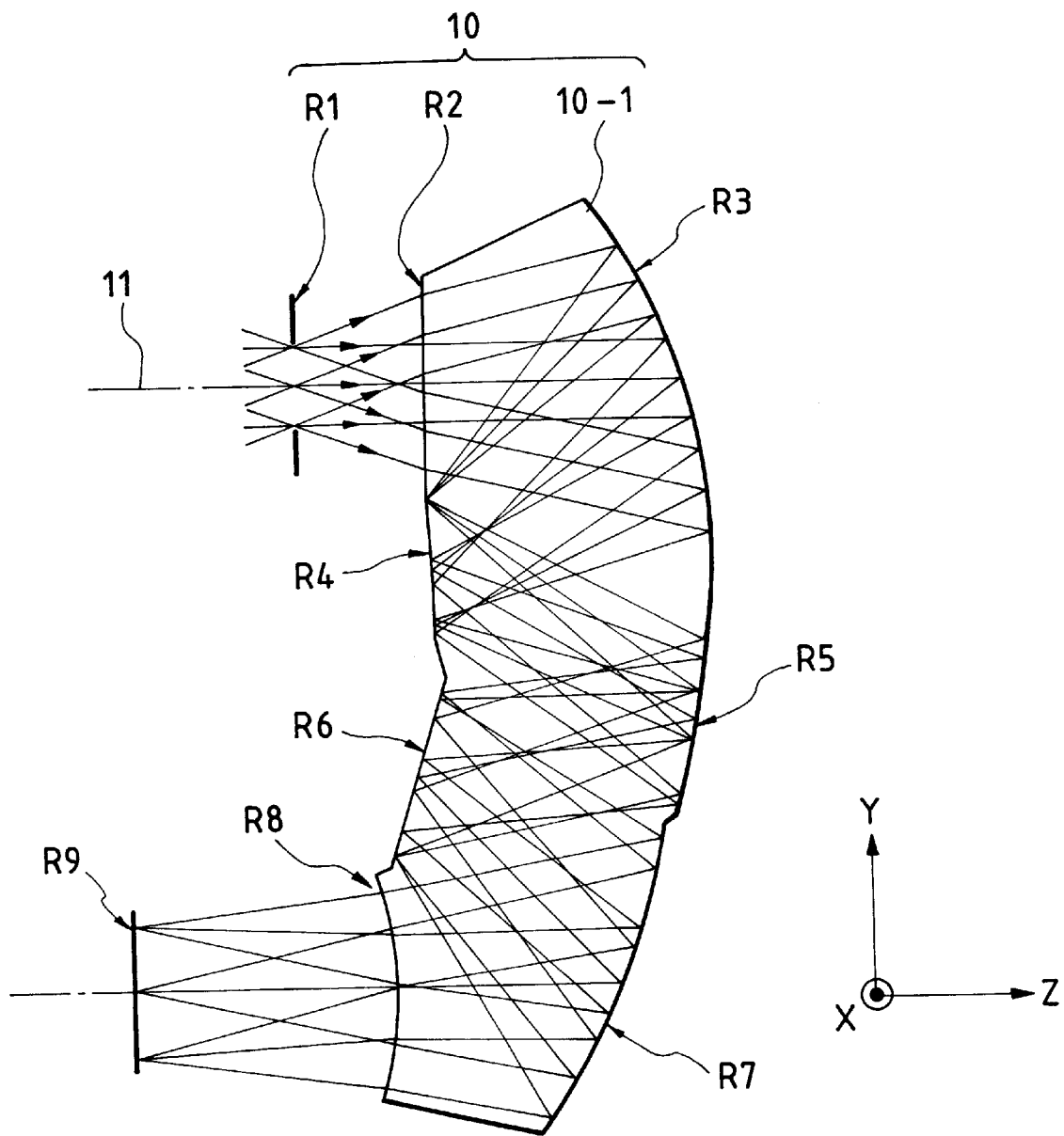
FIG. 6 is a cross-sectional view in the YZ plane of the optical system of Embodiment 2 according to the present invention.
Figure 7:
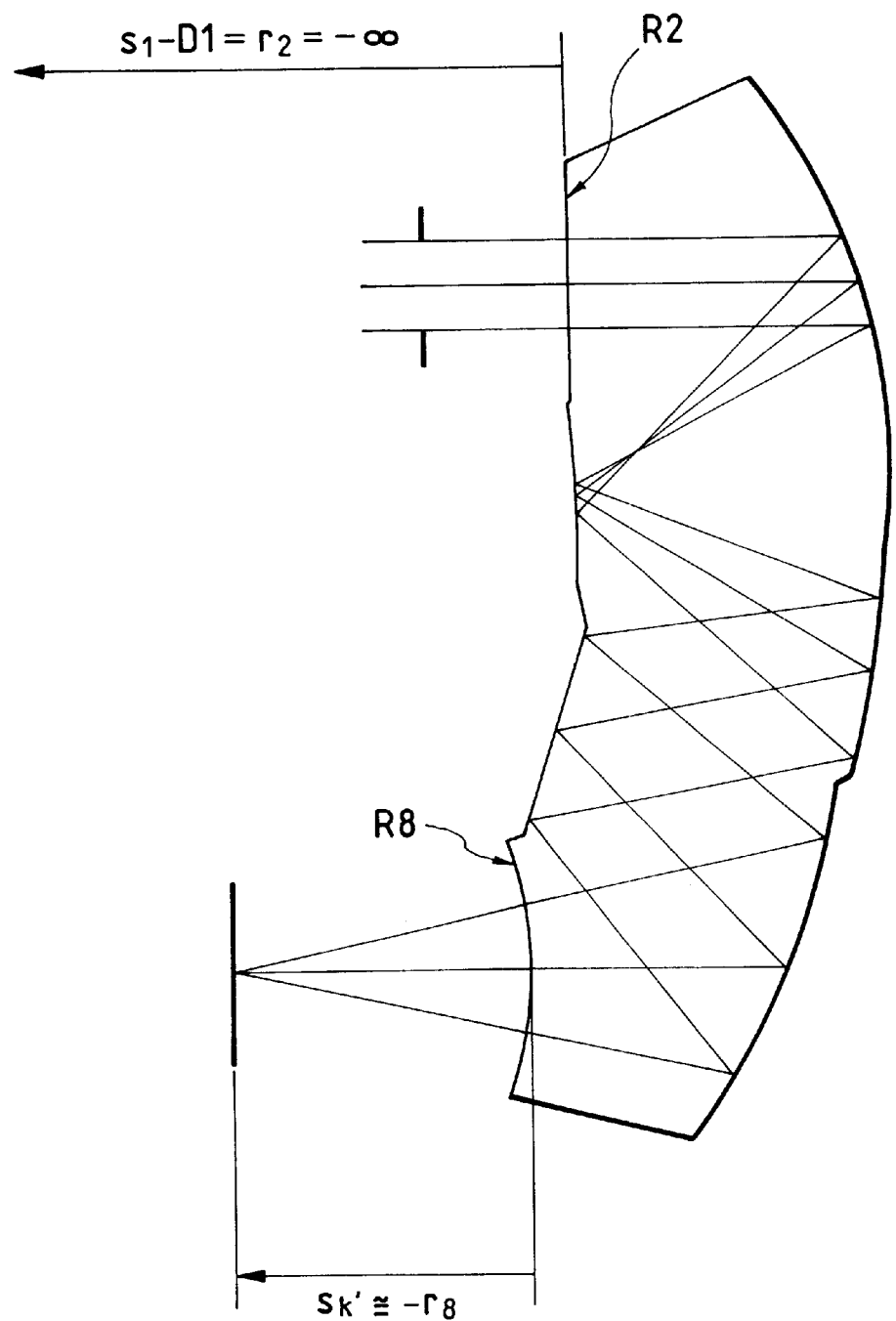
FIG. 7 is a cross-sectional view in the YZ plane of the optical system of Embodiment 2 according to the present invention, showing optical paths of axial rays.
Figure 8:
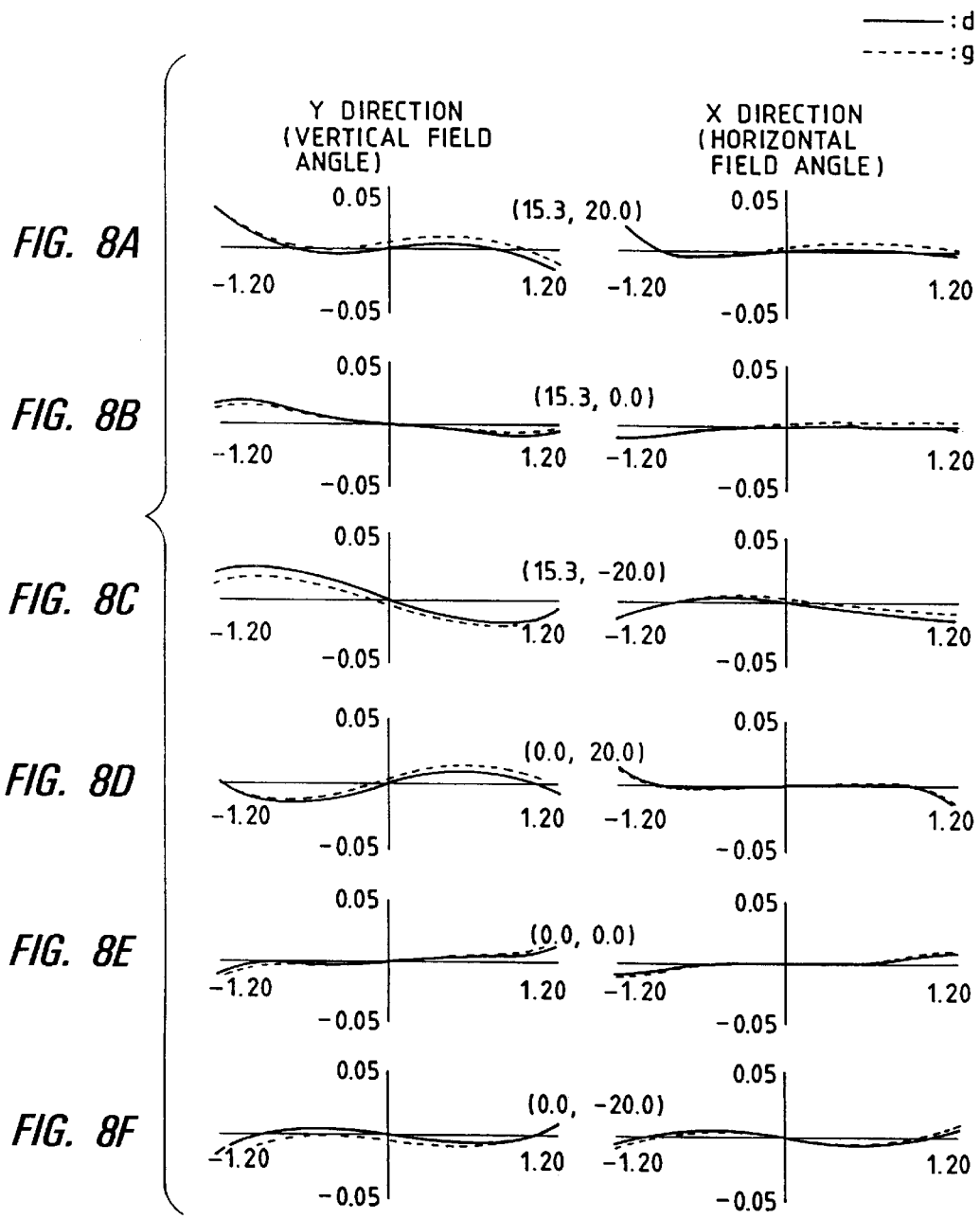
FIGS. 8A–8F are transverse aberration diagrams of Embodiment 2.

FIG. 6 is a cross-sectional view in the YZ plane of the optical system according to Embodiment 2 of the present invention. The present embodiment is a photographing optical system with the horizontal field angle 40.0° and the vertical field angle 30.6°. FIG. 6 also illustrates the optical paths. FIG. 7 also shows a cross-sectional view in the YZ plane of Embodiment 2 and illustrates the optical paths of axial rays. The constitutional data of the present embodiment is as follows.

| | |
|---|---|
| Horizontal half field angle | 20.0 |
| Vertical half field angle | 15.3 |
| Aperture size | 2.40 |
| Image size | 4 mm horizontal × 3 mm vertical |
| Reduced focal length | 5.37 mm |

| i | Yi | Zi | θi | Di | Ndi | νdi | |
|---|---|---|---|---|---|---|---|
| 1 | 0.00 | 0.00 | 0.00 | 4.00 | 1 | | aperture |
| 2 | 0.00 | 4.00 | 0.00 | 8.00 | 1.51633 | 64.15 | refracting surface |
| 3 | 0.00 | 12.00 | 18.00 | 9.72 | 1.51633 | 64.15 | reflecting surface |
| 4 | −5.71 | 4.14 | 3.00 | 9.33 | 1.51633 | 64.15 | reflecting surface |
| 5 | −10.38 | 12.22 | −10.00 | 8.84 | 1.51633 | 64.15 | reflecting surface |
| 6 | −11.91 | 3.52 | −18.00 | 8.91 | 1.51633 | 64.15 | reflecting surface |
| 7 | −18.32 | 9.70 | −23.00 | 6.98 | 1.51633 | 64.15 | reflecting surface |
| 8 | −18.32 | 2.73 | 0.00 | 8.06 | 1 | | refracting surface |
| 9 | −18.32 | −5.33 | −0.00 | 0.00 | 1 | | image plane |

Figure 10:
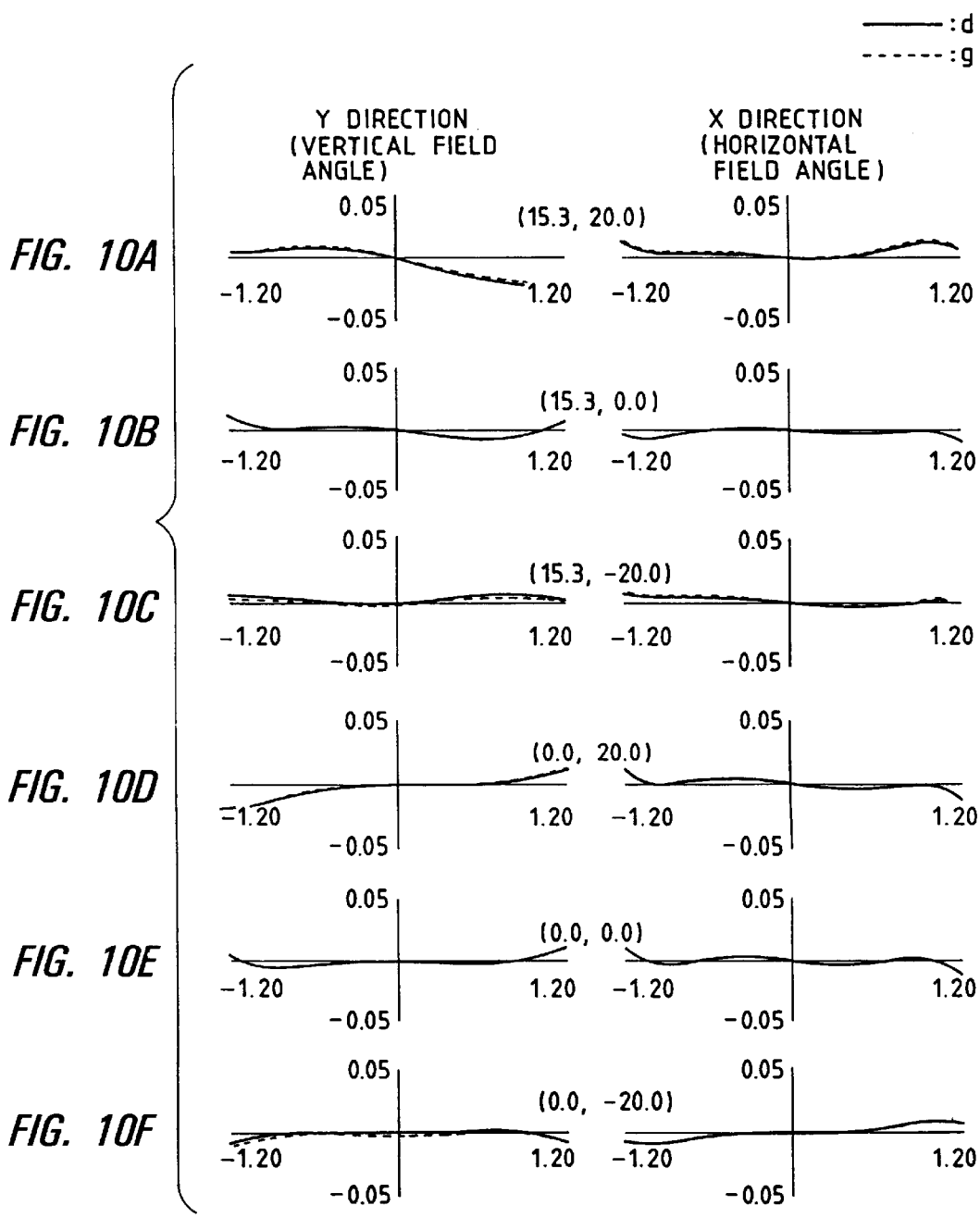
FIGS. 10A–10F are transverse aberration diagrams of Embodiment 3.

Shape of Spherical Surface
R2 surface $r_2=\infty$
R8 surface $r_8=-10.952$
Shape of Aspherical Surface
R3 surface $C_{02}=-3.07038\text{e}-02$ $C_{20}=-3.87628\text{e}-02$
  $C_{03}=1.83660\text{e}-04$ $C_{21}=-2.47678\text{e}-04$
  $C_{04}=1.82085\text{e}-05$ $C_{22}=-1.81479\text{e}-05$
  $C_{40}=-9.91286\text{e}-06$
R4 surface $C_{02}=-1.46712\text{e}-02$ $C_{20}=-8.04832\text{e}-02$
  $C_{03}=1.82943\text{e}-03$ $C_{21}=-2.88424\text{e}-03$
  $C_{04}=7.71058\text{e}-05$ $C_{22}=-8.94316\text{e}-04$
  $C_{40}=-7.74679\text{e}-04$
R5 surface $C_{02}=-1.54524\text{e}-02$ $C_{20}=-3.21031\text{e}-02$
  $C_{03}=6.71883\text{e}-04$ $C_{21}=-6.30965\text{e}-04$
  $C_{04}=-4.48412\text{e}-05$ $C_{22}=-7.00525\text{e}-05$
  $C_{40}=-5.65456\text{e}-05$
R6 surface $C_{02}=-3.51167\text{e}-03$ $C_{20}=-1.84016\text{e}-02$
  $C_{03}=3.35568\text{e}-04$ $C_{21}=-3.04934\text{e}-03$
  $C_{04}=-1.52491\text{e}-04$ $C_{22}=-2.38033\text{e}-04$
  $C_{40}=-1.93476\text{e}-04$
R7 surface $C_{02}=-2.08695\text{e}-02$ $C_{20}=-2.26946\text{e}-02$
  $C_{03}=9.05991\text{e}-05$ $C_{21}=-1.04282\text{e}-03$
  $C_{04}=-4.51664\text{e}-05$ $C_{22}=-3.44033\text{e}-05$
  $C_{40}=-3.07678\text{e}-05$ In FIG. 6, 10-1 designates an optical element, which is made of a transparent body of a glass or the like and which has a plurality of curved reflecting surfaces. Formed in the order of passage of ray from the object in the surfaces of the optical element 10-1 are a flat surface (incident surface) R2, five reflecting surfaces including a concave mirror R3, a reflecting surface R4, a concave mirror R5, a reflecting surface R6, and a concave mirror R7, and a concave refracting surface (the emergent surface) R8. R1 is the aperture (the entrance pupil) located on the object side of optical element 10-1 and R9 is the final image plane on which an image pickup surface of an image pickup device (image pickup medium) such as a CCD is located. Each of the aperture R1 and optical element 10-1 constitutes an element of the optical system 10. Numeral 11 denotes the reference axis of the optical system.

The two refracting surfaces are a flat surface and a rotationally symmetric, spherical surface. This is for satisfying the conditions of correction for chromatic aberration and for permitting accurate measurement of the reference axis in fabricating and evaluating the optical system. The rotationally symmetric configuration of the refracting surfaces decreases occurrence of asymmetric chromatic aberration. All the reflecting surfaces are surfaces symmetric with respect to the YZ plane.

Next described is the imaging action in the present embodiment. A beam 1 from the object is restricted in a quantity of incident light by the aperture stop R1, then enters the incident surface R2 of optical element 10-1, is reflected by the surface R3, thereafter is focused once between the surface R3 and the surface R4, then is reflected successively by the surfaces R4, R5, R6, and R7, is emergent from the emergent surface R8, and is again focused on the final image plane R9 being the image pickup surface of image pickup device. The beam incident through R2 forms an intermediate image inside. This is for making the optical system thinner, and the oblique principal rays outgoing from the aperture R1 are converged before expanding greatly, thereby preventing the effective diameter of each surface from increasing due to wider angle of the optical system.

In the present embodiment the reference axis including incidence and emergence all sits in the plane of drawing (or on the YZ plane).

As described, the optical element 10-1 functions as a lens unit having capability of forming image as a whole and the desired optical performance by the incident and emergent surfaces and the plurality of curved reflectors between them.

Each of the reflecting surfaces constituting the optical element 10-1 is such a so-called decentering reflecting surface that the normal line at an intersection between the incident and emergent reference axes and the reflecting surface does not coincide with the direction of the reference axis. This can prevent an eclipse occurring in the conventional mirror optical system, which permits us to arrange the surfaces more freely and to construct an optical element in a compact and free configuration with good space efficiency.

Further, the shape of each reflecting surface is a surface having only one symmetry plane with different refractive powers in two orthogonal planes (the yz plane and the xz plane). This is for suppressing decentering aberration occurring due to decentering placement of each reflecting surface.

The effects of the present embodiment will now be described. In the present embodiment, as seen from FIG. 7, the axial rays travel straight without being subject to refraction at the incident surface R2. This is because the radius $r_2$ of curvature of the incident surface is infinite in correspondence to an object at infinity. On the other hand, the axial ray is also rarely subject to refraction at the emergent surface R8. This is because the radius $r_8$ of curvature of the emergent surface is made nearly coincident with the distance $s_k'$ between the emergent surface and the image point. Satisfying the conditions of correction for chromatic aberration at the incident surface and emergent surface as described, the present embodiment effectively corrects chromatic aberration occurring at the refracting surfaces.

Specifically, the object distance is infinite at the incident surface and E=0 because the incident surface $r_2=\infty$ (flat surface). On the other hand, because at the emergent surface the distance $s_k'$ from the emergent surface to the image point=−D8=−8.06 and the final surface $r_8$=−10.952, E'=0.18. The sign of the radius of curvature thereof is negative because the image point and the center of curvature are in the minus direction of the z-axis of the local coordinate system of the emergent surface R8.

The ray aberration diagrams of the present embodiment are shown in FIGS. 8A–8F. The present embodiment achieves a well-balanced state of aberration correction and, especially as to chromatic aberration, the axial chromatic aberration and lateral chromatic aberration both are well corrected for.

In the present embodiment, focusing to a near object is effected by moving the entire optical system relative to the image pickup surface R9 of image pickup device. In particular, since in the present embodiment the direction of the reference axis incident to the optical element 10-1 and the direction of the reference axis emergent from the optical element 10-1 are parallel and opposite, the focusing operation can be performed in the same manner as in the conventional lens system by moving the entire optical system in parallel with the direction of the emergent reference axis (the Z-axis direction).

Next will be described chromatic aberration occurring upon focusing to a near object. Strictly speaking, the conditions of correction for chromatic aberration, Equations (10) and (11), at the incident surface and emergent surface as described previously hold as to specific image and object points. Particularly, in the case of a photographing optical system and where correction for chromatic aberration is effected for the infinite object as in the present embodiment, focusing with change of object distance would cause deviation from the correction conditions because of changes of $s_l$ and $s_k'$ in (10) and (11), which would result in generating chromatic aberration for near objects. It is thus preferable to change the incident surface from the flat surface to a weak concave surface on the object side in accordance with the range of object distance for operation of the present embodiment. Similarly, with the emergent surface, it is also preferable to slightly relax the curvature for correction for chromatic aberration determined from the back focus achieved when the object is at infinity.

Embodiment 3

Figure 9:
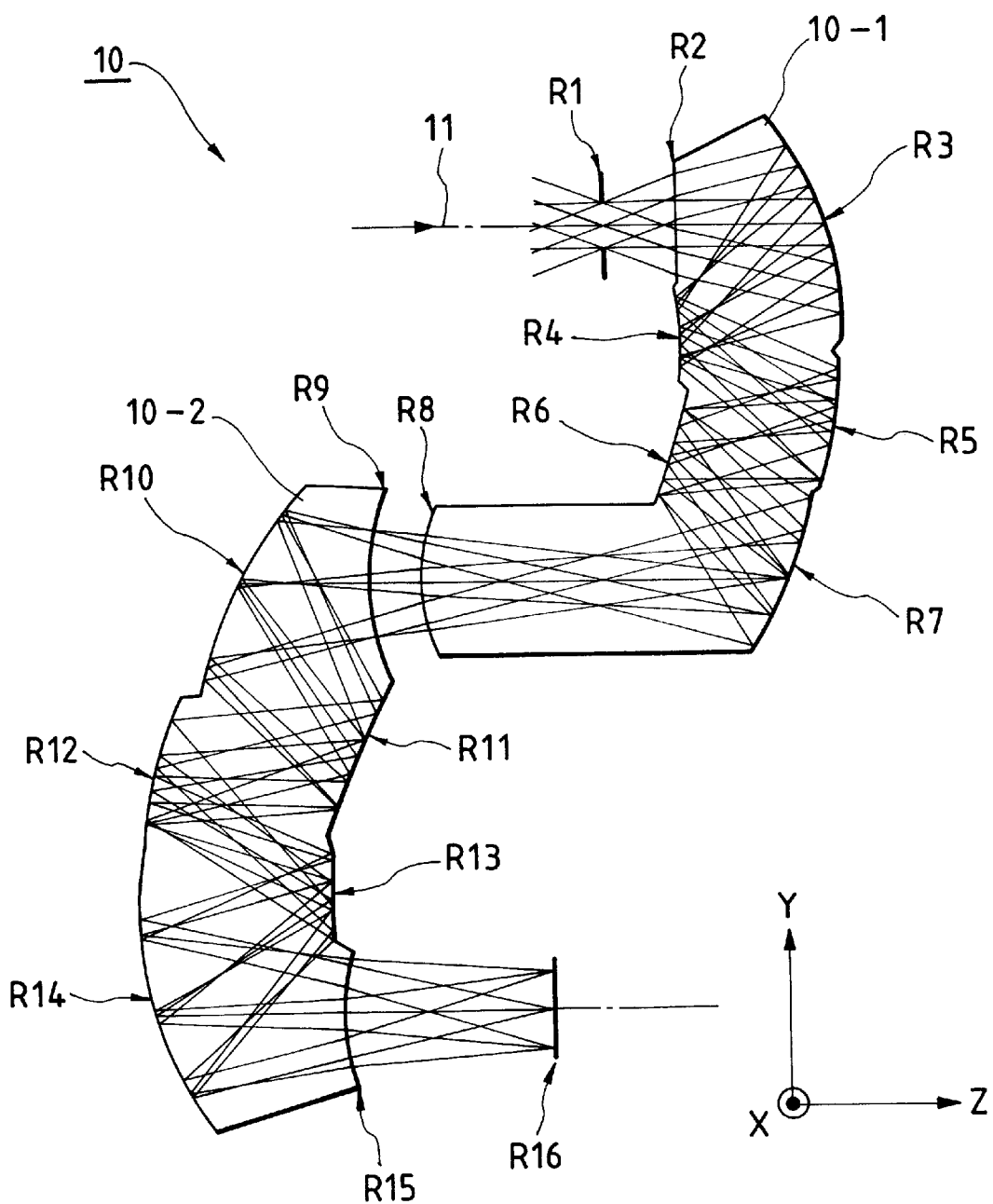
FIG. 9 is a cross-sectional view in the YZ plane of the optical system of Embodiment 3 according to the present invention.

FIG. 9 is a cross-sectional view in the YZ plane of the optical system according to Embodiment 3 of the present invention. The present embodiment is comprised of two optical elements 10-1, 10-2. The present embodiment is a photographing optical system with the horizontal field angle 40.0° and the vertical field angle 30.6°. FIG. 9 also illustrates the optical paths. The constitutional data of the present embodiment is as follows.

| Horizontal half field angle | 20.0 |
| Vertical half field angle | 15.3 |
| Aperture size | 2.40 |
| Image size | 4 mm horizontal × 3 mm vertical |
| Reduced focal length | 5.32 mm |

| i | Yi | Zi | θi | Di | Ndi | vdi | |
|---|------|------|------|------|---------|-------|-----------|
| 1 (10-1) | 0.00 | 0.00 | 0.00 | 4.00 | 1 | | aperture |
| 2 | 0.00 | 4.00 | 0.00 | 8.00 | 1.51633 | 64.15 | refracting surface |

-continued

| i | Yi | Zi | θi | Di | Ndi | νdi | |
|---|-----|-----|-----|-----|-----|-----|---|
| 3 | 0.00 | 12.00 | 18.00 | 9.72 | 1.51633 | 64.15 | reflecting surface |
| 4 | −5.71 | 4.14 | 3.00 | 9.33 | 1.51633 | 64.15 | reflecting surface |
| 5 | −10.38 | 12.22 | −10.00 | 8.84 | 1.51633 | 64.15 | reflecting surface |
| 6 | −11.91 | 3.52 | −18.00 | 8.91 | 1.51633 | 64.15 | reflecting surface |
| 7 | −18.32 | 9.70 | −23.00 | 19.50 | 1.51633 | 64.15 | reflecting surface |
| 8 | −18.32 | −9.80 | 0.00 | 2.79 | 1 | | refracting surface |
| (10-2) | | | | | | | |
| 9 | −18.32 | −12.58 | 0.00 | 7.00 | 1.51633 | 64.15 | refracting surface |
| 10 | −18.32 | −19.58 | −28.00 | 11.00 | 1.51633 | 64.15 | reflecting surface |
| 11 | −27.44 | −13.43 | −24.00 | 11.00 | 1.51633 | 64.15 | reflecting surface |
| 12 | −28.97 | −24.32 | −12.00 | 11.00 | 1.51633 | 64.15 | reflecting surface |
| 13 | −34.80 | −15.00 | 0.00 | 11.00 | 1.51633 | 64.15 | reflecting surface |
| 14 | −40.63 | −24.32 | 16.00 | 10.00 | 1.51633 | 64.15 | reflecting surface |
| 15 | −40.63 | −14.32 | 0.00 | 10.99 | 1 | | refracting surface |
| 16 | −40.63 | −3.33 | −0.00 | 0.00 | 1 | | image plane |

Shape of Spherical Surface
R2 surface $r_2 = -552.940$
R8 surface $r_8 = 9.454$
R9 surface $r_9 = 12.087$
R15 surface $r_{15} = 10.967$
Shape of Aspherical Surface
R3 surface $C_{02} = -3.30513e-02$ $C_{20} = -4.11546e-02$
 $C_{03} = 1.35386e-04$ $C_{21} = -3.45949e-04$
 $C_{04} = 6.33281e-06$ $C_{22} = -6.71079e-05$
 $C_{40} = -2.77244e-05$
R4 surface $C_{02} = -2.65687e-02$ $C_{20} = -8.14436e-02$
 $C_{03} = 2.30675e-03$ $C_{21}$ $1.37463e-03$
 $C_{04} = -1.14863e-05$ $C_{22} = 5.82949e-04$
 $C_{40} = -7.81862e-05$
R5 surface $C_{02} = -2.53347e-02$ $C_{20} = -3.59879e-02$
 $C_{03} = 4.69566e-04$ $C_{21} = 1.58591e-04$
 $C_{04} = -3.66462e-05$ $C_{22} = -7.23896e-05$
 $C_{40} = -4.16183e-05$
R6 surface $C_{02} = -7.70463e-03$ $C_{20} = -1.12822e-02$
 $C_{03} = 1.42491e-03$ $C_{21} = 1.02846e-03$
 $C_{04} = -2.65184e-04$ $C_{22} = -3.27737e-04$
 $C_{40} = -7.38409e-05$
R7 surface $C_{02} = -2.53531e-02$ $C_{20} = -1.70323e-02$
 $C_{03} = 3.50655e-04$ $C_{21} = -6.36030e-04$
 $C_{04} = -7.11854e-05$ $C_{22} = -9.99628e-05$
 $C_{40} = -1.62659e-05$
R10 surface $C_{02} = 2.13066e-02$ $C_{20} = 2.33512e-02$
 $C_{03} = 7.47353e-05$ $C_{21} = -1.16964e-03$
 $C_{04} = 1.76555e-05$ $C_{22} = 1.19209e-04$
 $C_{40} = 2.53072e-05$
R11 surface $C_{02} = 5.73294e-03$ $C_{20} = 1.17300e-02$
 $C_{03} = 5.38313e-04$ $C_{21} = 1.15995e-03$
 $C_{04} = 8.76678e-05$ $C_{22} = -2.77257e-04$
 $C_{40} = -1.01760e-04$
R12 surface $C_{02} = 2.50561e-02$ $C_{20} = 3.19858e-02$
 $C_{03} = 8.17616e-05$ $C_{21} = -8.65236e-04$
 $C_{04} = 1.76580e-05$ $C_{22} = 2.51854e-05$
 $C_{40} = 2.68929e-05$
R13 surface $C_{02} = 7.72528e-03$ $C_{20} = 1.47716e-02$
 $C_{03} = -130043e-03$ $C_{21} = 2.49407e-03$
 $C_{04} = 1.37907e-04$ $C_{22} = -6.38285e-04$
 $C_{40} = -1.91814e-04$
R14 surface $C_{02} = 2.57400e-02$ $C_{20} = 3.08719e-02$
 $C_{03} = -1.57711e-04$ $C_{21} = -9.45123e-04$
 $C_{04} = 2.38627e-05$ $C_{22} = -3.12422e-05$
 $C_{40} = 2.35376e-05$ The optical system 10 of the present embodiment is comprised of the aperture stop R1 and two optical elements 10-1, 10-2, and each optical element 10-1, 10-2 is made of a transparent body of a glass or the like and has a plurality of curved reflecting surfaces. Formed in the order of passage of ray from the object in the surfaces of the optical element 10-1 are a weak concave refracting surface (incident surface) R2, five reflecting surfaces including a concave mirror R3, a convex mirror R4, a concave mirror R5, a reflecting surface R6, and a concave mirror R7, and a convex refracting surface (emergent surface) R8. On the other hand, formed in the order of passage of ray from the object in the surfaces of the optical element 10-2 are a concave refracting surface (incident surface) R9, five reflecting surfaces including a concave mirror R10, a reflecting surface R11, a concave mirror R12, a reflecting surface R13, and a concave mirror R14, and a concave refracting surface (emergent surface) R15. R1 denotes the aperture stop (the entrance pupil) disposed on the object side of the optical element 10 and R16 is the final image plane, on which the image pickup surface of the image pickup device such as the CCD is located. Numeral 11 designates the reference axis of the photographing optical system.

The refracting surfaces of each optical element both are rotationally symmetric, spherical surfaces and the all reflecting surfaces are surfaces symmetric with respect to the YZ plane.

The imaging action of the present embodiment will now be described. The beam from the object is restricted in the quantity of incident light by the aperture (the entrance pupil) R1, then enters the incident surface R2 of the optical element 10-1, is reflected by the surface R3, thereafter is focused once near the surface R4, then is reflected successively by the surfaces R4, R5, R6, and R7, is again focused between the surface R7 and the surface R8, is emergent from the emergent surface R8, and then is incident to the second optical element 10-2. The beam incident to the incident surface R9 of the optical element 10-2 is reflected by the surfaces R10, R11, then is focused once near the surface R12, is reflected successively by the surfaces R12, R13, and R14, is emergent from the emergent surface R15, and then forms an image on the final image plane R16.

As described, the optical system of the present embodiment functions as an optical system having capability of forming image as a whole in the combination of the optical elements having the desired refractive power and optical performance by the refractive power of the incident and emergent surfaces and the refractive power of the plurality of curved reflectors therein.

The ray aberration diagrams of the present embodiment are shown in FIGS. 10A–10F.

The present embodiment comprises the optical system excellent in the imaging performance as a whole by the combination of the two optical elements having the refractive power and, especially as to chromatic aberration, it is corrected in each unit of optical element.

Namely, correction for chromatic aberration is effectively achieved by forming the incident surface R2 of the optical element 10-1 in the shape of the weak concave surface (−552.94) close to the flat surface in correspondence to the infinite object to near object, thus making $E_1$=0.01. On the other hand, at the emergent surface R8 the image of the optical element 10-1 is a virtual image the image point of which is inside the element (between the reflecting surface R7 and the emergent surface R8, $|s_8'|$=8.64) and the emergent surface R8 is formed as a convex surface $r_8$=9.454 to attain $E_1'$=0.05, whereby the radius of curvature thereof is made nearly coincident with the distance from the emergent surface to the image point. As a result, the axial rays are rarely subject to refraction at this emergent surface and, together with the condition for the incident surface, chromatic aberration is corrected for in the optical element 10-1 alone.

On the other hand, the incident surface R9 of the second optical element 10-2 is a concave surface having the center of curvature on the object side and $r_9$=12.087 and the object distance thereto is 11.43, thus attaining $E_2$=0.03. With the emergent surface R15, $s_{15}'$=10.99 and the emergent surface R15 is a concave surface having the center of curvature on the image point side and $r_{15}$=10.967, thus attaining $E_2'$=0.00. Therefore, chromatic aberration is corrected for in the optical element 10-2 alone.

As described above, the present embodiment is effectively corrected for chromatic aberration as a total system in the combination of the two optical elements each being corrected for chromatic aberration itself.

Embodiment 4

Figure 11:
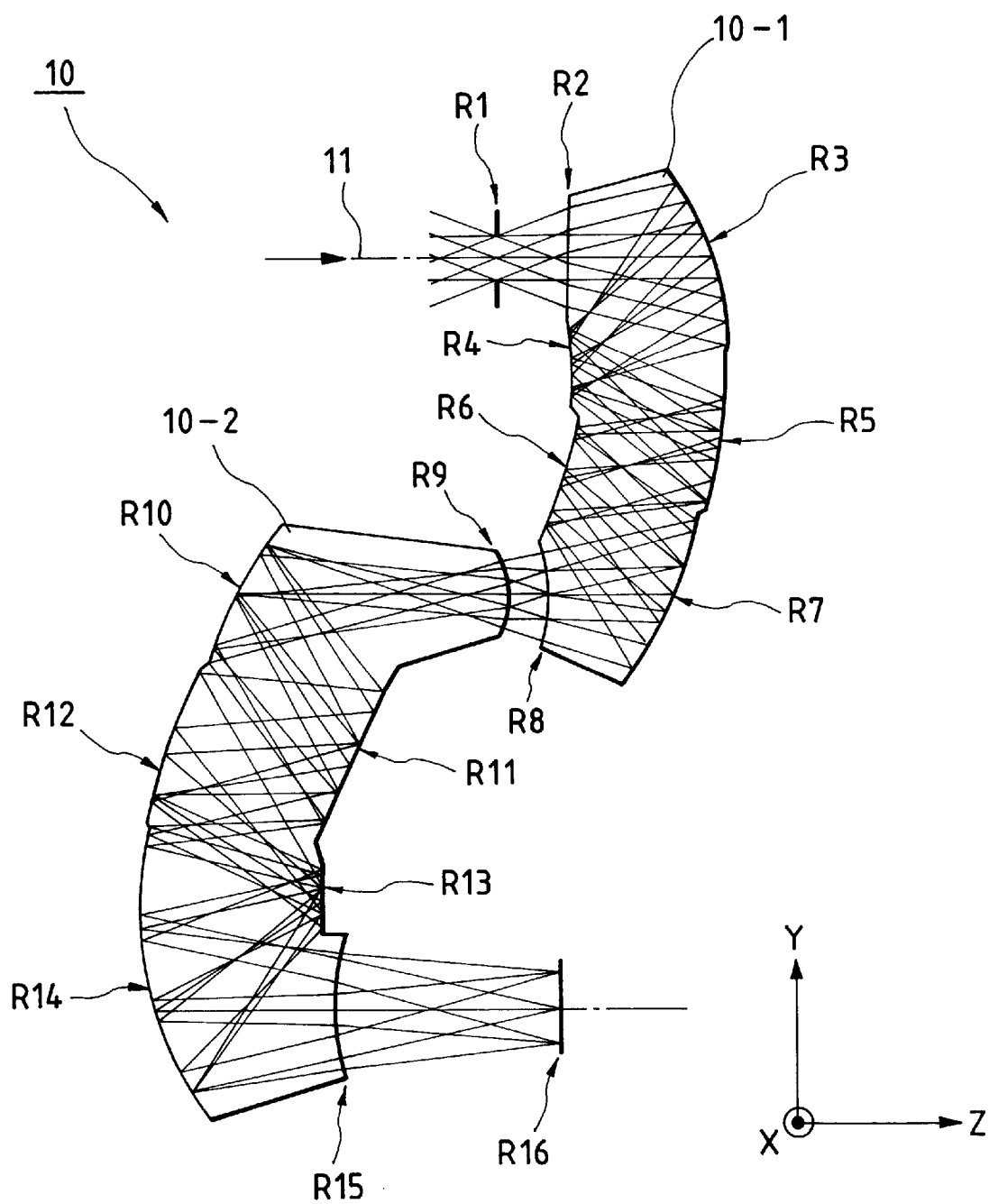
FIG. 11 is a cross-sectional view in the YZ plane of the optical system of Embodiment 4 according to the present invention.
Figure 12:
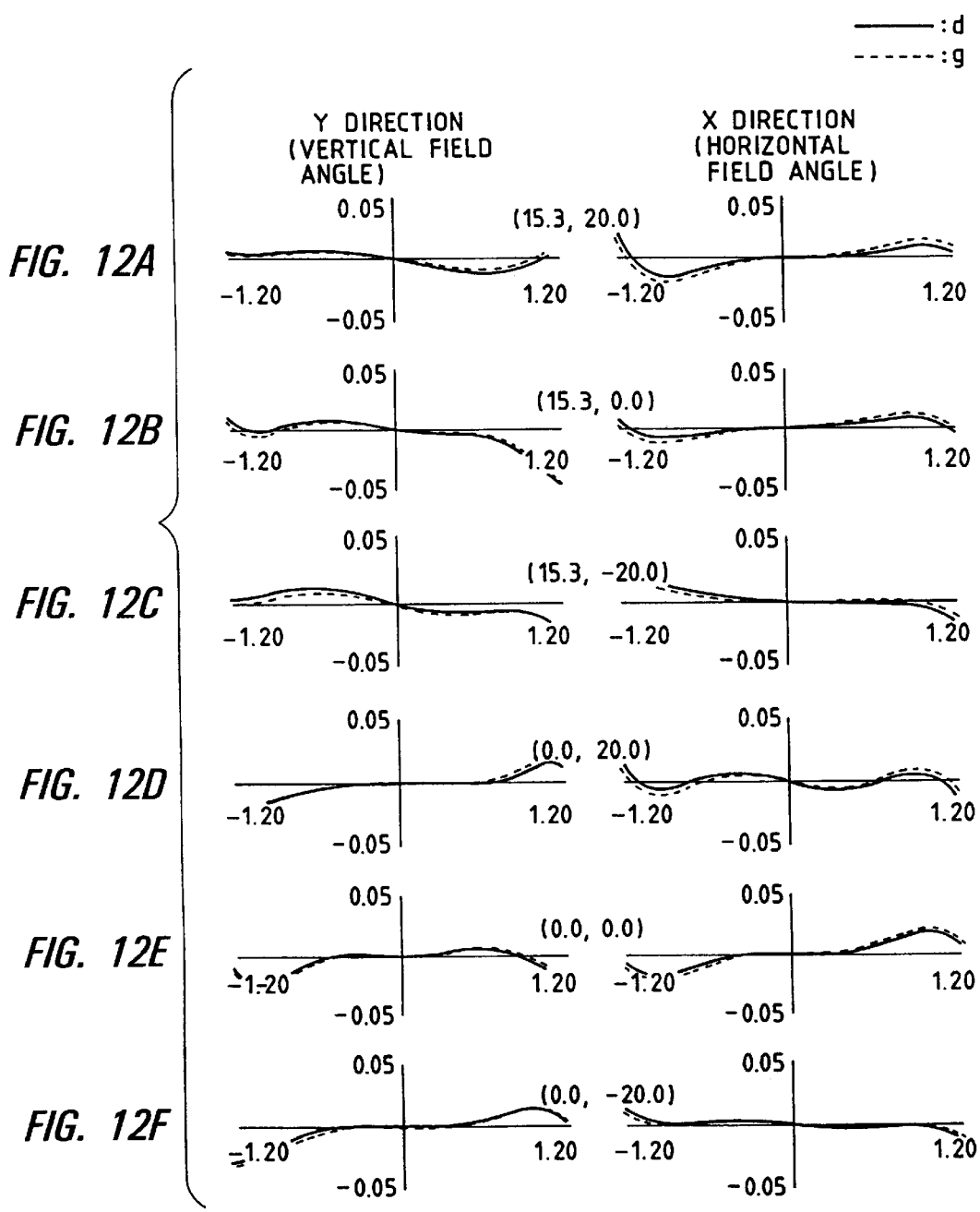
FIGS. 12A–12F are transverse aberration diagrams of Embodiment 4.

FIG. 11 is a cross-sectional view in the YZ plane of the optical system according to Embodiment 4 of the present invention. The optical system 10 of the present embodiment is comprised of the aperture stop R1 and two optical elements 10-1, 10-2. The present embodiment is a photographing optical system with the horizontal field angle 40.0° and the vertical field angle 30.6°. FIG. 11 also illustrates the optical paths. The constitutional data of the present embodiment is as follows.

| Horizontal half field angle | 20.0 |
| Vertical half field angle | 15.3 |
| Aperture size | 2.40 |
| Image size | 4 mm horizontal × 3 mm vertical |
| Reduced focal length f | 5.45 mm |

| i | Yi | Zi | θi | Di | Ndi | νdi | |
|---|---|---|---|---|---|---|---|
| 1 (10-1) | 0.00 | 0.00 | 0.00 | 4.00 | 1 | | aperture |
| 2 | 0.00 | 4.00 | 0.00 | 8.00 | 1.51633 | 64.15 | refracting surface |
| 3 | 0.00 | 12.00 | 18.00 | 9.72 | 1.51633 | 64.15 | reflecting surface |
| 4 | −5.71 | 4.14 | 3.00 | 9.33 | 1.51633 | 64.15 | reflecting surface |
| 5 | −10.38 | 12.22 | −10.00 | 8.84 | 1.51633 | 64.15 | reflecting surface |
| 6 | −11.91 | 3.52 | −18.00 | 8.91 | 1.51633 | 64.15 | reflecting surface |
| 7 | −18.32 | 9.70 | −23.00 | 6.98 | 1.51633 | 64.15 | reflecting surface |
| 8 | −18.32 | 2.73 | 0.00 | 2.27 | 1 | | refracting surface |
| (10-2) | | | | | | | |
| 9 | −18.32 | 0.46 | 0.00 | 15.00 | 1.51633 | 64.15 | refracting surface |
| 10 | −18.32 | −14.54 | −28.00 | 11.00 | 1.51633 | 64.15 | reflecting surface |
| 11 | −27.44 | −8.39 | −24.00 | 11.00 | 1.51633 | 64.15 | reflecting surface |
| 12 | −28.97 | −19.28 | −12.00 | 11.00 | 1.51633 | 64.15 | reflecting surface |
| 13 | −34.80 | −9.95 | 0.00 | 11.00 | 1.51633 | 64.15 | reflecting surface |
| 14 | −40.63 | −19.28 | 16.00 | 10.00 | 1.51633 | 64.15 | reflecting surface |
| 15 | −40.63 | −9.28 | 0.00 | 12.46 | 1 | | refracting surface |
| 16 | −40.63 | 3.18 | −0.00 | 0.00 | 1 | | image plane |

Shape of Spherical Surface
R2 surface $r_2$=−718.657
R8 surface $r_8$=−8.427
R9 surface $r_9$=−4.043
R15 surface $r_{15}$=12.755

Shape of Aspherical Surface
R3 surface $C_{02}$=−3.26768e-02 $C_{20}$=−3.99255e-02
 $C_{03}$=2.30525e-05 $C_{21}$=−2.24196e-04
 $C_{04}$=1.28900e-07 $C_{22}$=−4.05503e-05
 $C_{40}$=−2.43683e-05
R4 surface $C_{02}$=−2.29750e-02 $C_{20}$=−1.07533e-01
 $C_{03}$=2.03115e-03 $C_{21}$=−5.57239e-03
 $C_{04}$=−2.27345e-04 $C_{22}$=−1.42335e-03
 $C_{40}$=−1.12200e-03
R5 surface $C_{02}$=−1.90548e-02 $C_{20}$=−3.32535e-02
 $C_{03}$=7.44119e-04 $C_{21}$=−4.06775e-04
 $C_{04}$=−4.58897e-06 $C_{22}$=−7.09493e-05
 $C_{40}$=−6.28209e-05
R6 surface $C_{02}$=−3.99117e-03 $C_{20}$=−1.61346e-02
 $C_{03}$=6.91142e-04 $C_{21}$=−1.45068e-03
 $C_{04}$=−1.15772e-04 $C_{22}$=−1.23744e-04
 $C_{40}$=−1.26165e-04
R7 surface $C_{02}$=−2.30162e-02 $C_{20}$=−2.55168e-02
 $C_{03}$=2.32867e-04 $C_{21}$=−8.88810e-04
 $C_{04}$=−6.40970e-05 $C_{22}$=−1.24550e-05
 $C_{40}$=1.01072e-05
R10 surface $C_{02}$=2.17975e-02 $C_{20}$=2.47466e-02
 $C_{03}$=9.97468e-05 $C_{21}$=6.39996e-04
 $C_{04}$=−4.72795e-05 $C_{22}$=−4.45879e-05
 $C_{40}$=−2.17738e-05
R11 surface $C_{02}$=−1.04346e-03 $C_{20}$=1.04628e-02
 $C_{03}$=1.21962e-03 $C_{21}$=1.62194e-03
 $C_{04}$=9.87976e-05 $C_{22}$=8.20826e-05
 $C_{40}$=−2.13347e-05
R12 surface $C_{02}$=2.57361e-02 $C_{20}$=3.22622e-02
 $C_{03}$=−5.94528e-05 $C_{21}$=−1.96348e-04
 $C_{04}$=2.82328e-05 $C_{22}$=5.68232e-05
 $C_{40}$=3.16787e-05
R13 surface $C_{02}$=1.83729e-02 $C_{20}$=−6.23117e-04
 $C_{03}$=−2.49773e-03 $C_{21}$=−8.91999e-03
 $C_{04}$=−4.47218e-04 $C_{22}$=−1.42817e-03
 $C_{40}$=−1.19674e-03

R14 surface $C_{02}=2.78563\text{e-}02$ $C_{20}=3.29901\text{e-}02$ $C_{03}=-1.99079\text{e-}04$ $C_{21}=-2.23795\text{e-}04$ $C_{04}=3.24076\text{e-}05$ $C_{22}=6.35580\text{e-}05$ $C_{40}=3.28233\text{e-}05$ The optical system 10 of the present embodiment is comprised of the aperture R1 and the two optical elements 10-1, 10-2, and each optical element 10-1, 10-2 is made of a transparent body of a glass or the like and has a plurality of curved reflecting surfaces in the surfaces thereof. Formed in the order of passage of ray from the object in the surfaces of the optical element 10-1 are a weak concave refracting surface (incident surface) R2, five reflecting surfaces including a concave mirror R3, a convex mirror R4, a concave mirror R5, a reflecting surface R6, and a concave mirror R7, and a concave refracting surface (emergent surface) R8. On the other hand, formed in the order of passage of ray from the object in the surfaces of the optical element 10-2 are a convex refracting surface (incident surface) R9, five reflecting surfaces including a concave mirror R10, a reflecting surface R11, a concave mirror R12, a convex mirror R13, and a concave mirror R14, and a concave refracting surface (emergent surface) R15. R1 is the aperture stop (the entrance pupil) disposed on the object side of the optical element 10 and R16 is the final image plane, on which the image pickup surface of the image pickup device such as the CCD is located. Numeral 11 designates the reference axis of the photographing optical system.

Each of the refracting surfaces of each optical element is a rotationally symmetric, spherical surface and all the reflecting surfaces are surfaces having only one symmetry plane in symmetry with respect to the YZ plane.

The imaging action of the present embodiment will now be described. The beam from the object is restricted in the quantity of incident light by the aperture (entrance pupil) R1, thereafter enters the incident surface R2 of the optical element 10-1, then is reflected by the surface R3, thereafter is focused once near the surface R4, next is reflected successively by the surfaces R4, R5, R6, and R7, is emergent from the emergent surface R8, and then is incident to the second optical element 10-2. The beam incident to the incident surface R9 of the optical element 10-2 is once focused between the surfaces R9 and R10, is reflected by the surfaces R10, R11, and R12, then is once focused near the surface R13, thereafter is reflected successively by the surfaces R13 and R14, is emergent from the emergent surface R15, and then forms an image on the final image plane R16.

As described, the optical system 10 functions as a lens system having capability of forming image as a whole by combining the plurality of optical elements having the desired refractive power and optical performance by the refractive power of the incident and emergent surfaces and the refractive power of the plurality of curved reflectors therein.

The ray aberration diagrams of the present embodiment are shown in FIGS. 12A–12F.

The present embodiment comprises the optical system excellent in the imaging performance as a whole in the combination of the two optical elements having the refracting power and, especially as to chromatic aberration, chromatic aberration is corrected for in each unit of optical element, similarly as in the other embodiments.

Namely, in the optical element 10-1 the incident surface R2 is the weak concave surface ($r_2=-718.657$) close to the flat surface in correspondence to the infinite object to near object, similarly as in Embodiment 1, and the center point of object and the center of curvature are on the same side, thus attaining the value of the chromatic aberration correction condition $E_1=0.01$ and thereby effectively achieving correction for chromatic aberration. In addition, the emergent surface R8 is such a concave surface that the image point of the axial rays emerging from the optical element 10-1 and the center of curvature are on the same side, and the value of the chromatic aberration correction condition $E_1'=0.41$ is attained from the radius of curvature $r_8=-8.427$ and the image point distance $s_8'=5.17$, thus effectively achieving correction for chromatic aberration.

On the other hand, in the second optical element 10-2, the object point for the incident surface R9 ($r_9=-4.03$) is at $s_9=2.90$, and the incident surface is such a convex surface that the center of curvature of the incident surface is on the same side as the object point, thus attaining the value of the chromatic aberration correction condition $E_2=0.53$. The emergent surface R15, similarly as in the other embodiments, is such a concave surface that the image point of the axial rays emerging from the optical element 10-2 and the center of curvature are on the same side, the radius of curvature $r_{15}=12.755$, the distance from the emergent surface to the image point $s_{15}'=12.46$, and the value of the chromatic aberration correction condition $E_2'=0.01$, thus effectively achieving correction for chromatic aberration. As a result, together with the condition for the incident surface, chromatic aberration is corrected for in the element 10-2 alone.

As described above, the present embodiment is corrected for chromatic aberration as a total system in the combination of the two optical elements each corrected for chromatic aberration itself.

In the embodiments as described above, the conditions of correction for chromatic aberration also hold when the object point and image point are switched from each other, and therefore, they can be applied to various optical systems.

Embodiment 5

Figure 13:
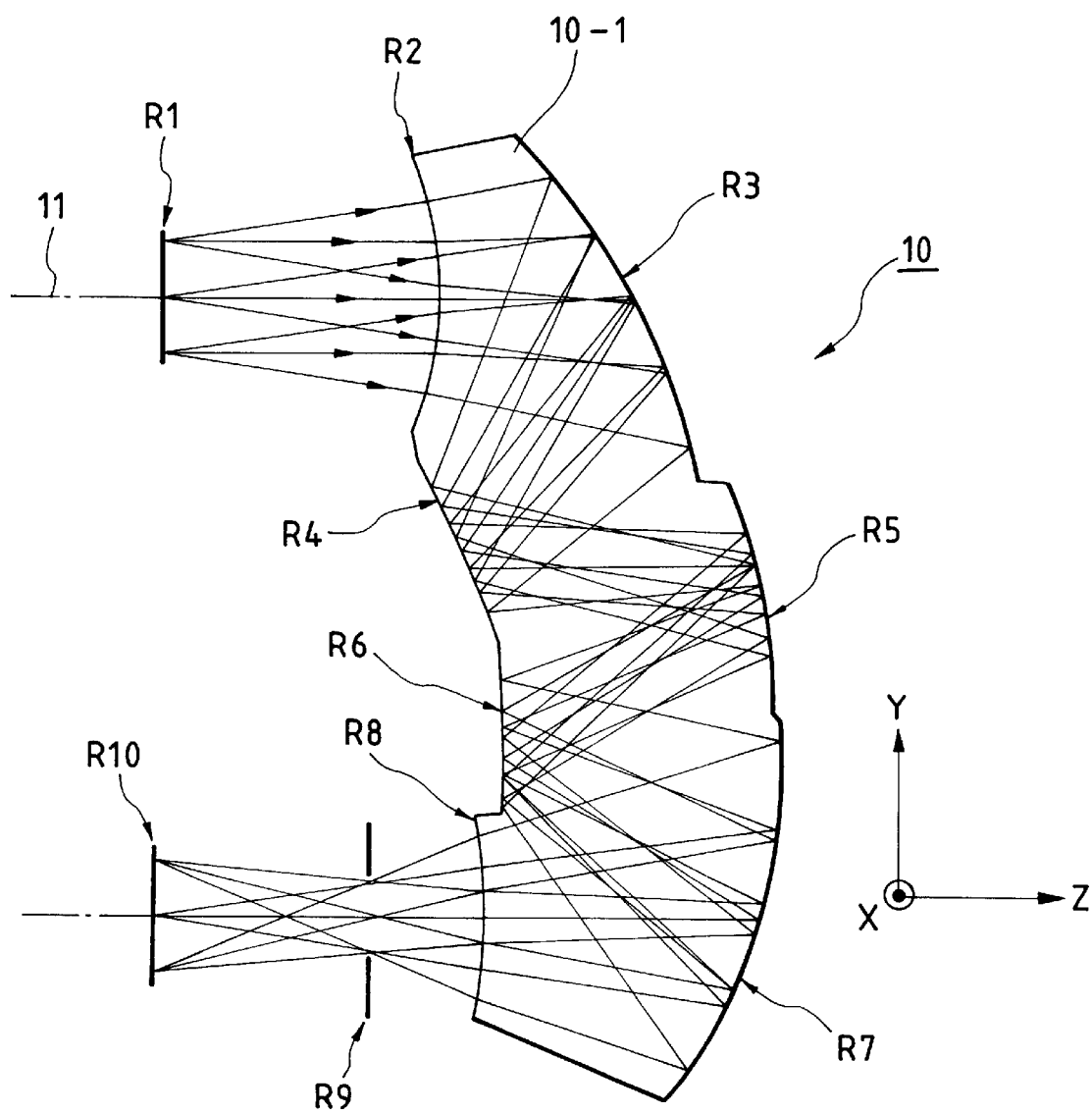
FIG. 13 is a cross-sectional view in the YZ plane of the optical system of Embodiment 5 according to the present invention.
Figure 14:
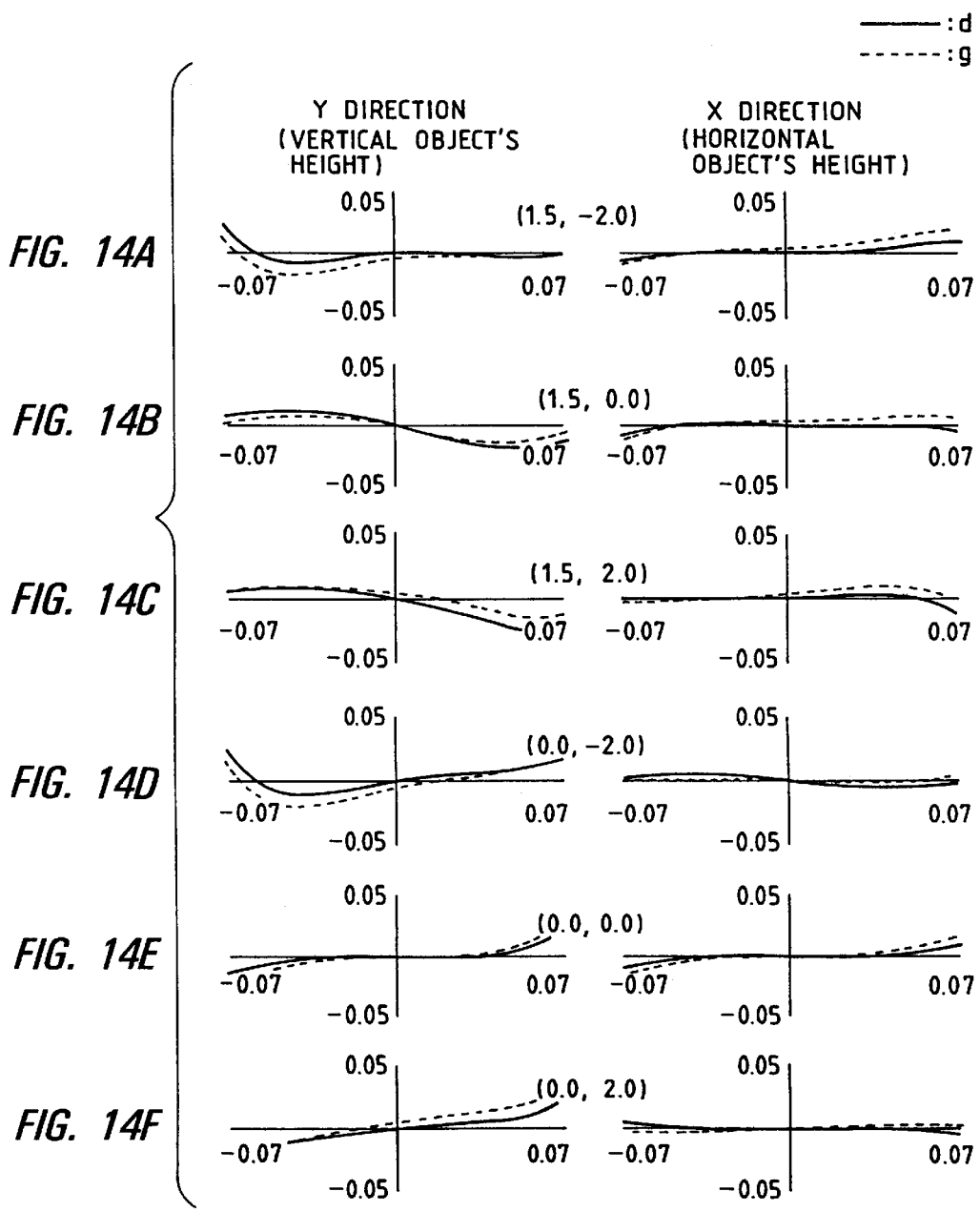
FIGS. 14A–14F are transverse aberration diagrams of Embodiment 5.

FIG. 13 is a cross-sectional view in the YZ plane of the optical system according to Embodiment 5 of the present invention. The present embodiment is a finite object imaging optical system for performing unity magnification (1:1 image formation). FIG. 13 also illustrates the optical paths. The present embodiment, different from the other embodiments, has the aperture stop R9 provided between the final surface R8 and the image plane R10. Further, the reference axis is provided along a ray traveling from the center of the aperture R9 to the center of the image plane R10. In addition, the origin of the absolute coordinate system is located at an intersection between the object plane and the reference axis.

The constitutional data of the present embodiment is as follows.

| Object size | 4 mm horizontal × 3 mm vertical |
|---|---|
| Object-side NA | 0.15 (FNo 3.3 equivalent) |
| Image size | 4 mm horizontal × 3 mm vertical |
| Reduced focal length f | 8.36 mm |

| i | Yi | Zi | θi | Di | Ndi | vdi | |
|---|---|---|---|---|---|---|---|
| 1 | 0.00 | 0.00 | 0.00 | 10.00 | 1 | | object plane |
| 2 | 0.00 | 10.00 | 0.00 | 7.00 | 1.51633 | 64.15 | refracting surface |

-continued

| i | Yi | Zi | θi | Di | Ndi | vdi | |
|---|---|---|---|---|---|---|---|
| 3 | 0.00 | 17.00 | 28.00 | 11.00 | 1.51633 | 64.15 | reflecting surface |
| 4 | −9.12 | 10.85 | 24.00 | 11.00 | 1.51633 | 64.15 | reflecting surface |
| 5 | −10.65 | 21.74 | 12.00 | 11.00 | 1.51633 | 64.15 | reflecting surface |
| 6 | −16.48 | 12.41 | 0.00 | 11.00 | 1.51633 | 64.15 | reflecting surface |
| 7 | −22.31 | 21.74 | −16.00 | 10.00 | 1.51633 | 64.15 | reflecting surface |
| 8 | −22.31 | 11.74 | 0.00 | 4.15 | 1 | | refracting surface |
| 9 | −22.31 | 7.59 | 0.00 | 7.80 | 1 | | aperture |
| 10 | −22.31 | −0.21 | 0.00 | 0.00 | 1 | | image plane |

Shape of Spherical Surface
R2 surface $r_2 = -12.533$
R8 surface $r_8 = -18.546$
Shape of Aspherical Surface
R3 surface $C_{02} = -2.11301e-02$ $C_{20} = -2.25191e-02$
$C_{03} = 7.85832e-05$ $C_{21} = 9.47005e-04$
$C_{04} = 7.74641e-07$ $C_{22} = -1.09338e-04$
$C_{40} = -2.28217e-05$
R4 surface $C_{02} = -6.84044e-03$ $C_{20} = -1.13100e-02$
$C_{03} = -1.36540e-03$ $C_{21} = -2.57167e-03$
$C_{04} = -1.89804e-04$ $C_{22} = 1.01870e-04$
$C_{40} = -3.74081e-05$
R5 surface $C_{02} = -2.75050e-02$ $C_{20} = -3.21814e-02$
$C_{03} = 3.57006e-06$ $C_{21} = 3.45061e-04$
$C_{04} = -2.73007e-05$ $C_{22} = -4.96141e-05$
$C_{40} = -2.77335e-05$
R6 surface $C_{02} = -1.57952e-02$ $C_{20} = -6.94429e-03$
$C_{03} = 1.30589e-03$ $C_{21} = -5.93952e-03$
$C_{04} = -2.59129e-04$ $C_{22} = 1.11449e-03$
$C_{40} = -1.19082e-04$
R7 surface $C_{02} = -2.63297e-02$ $C_{20} = -3.08134e-02$
$C_{03} = 2.34930e-04$ $C_{21} = 7.97596e-04$
$C_{04} = -3.55951e-05$ $C_{22} = -1.32532e-05$
$C_{40} = -2.97553e-05$ In FIG. 13, 10-1 is the optical element having a plurality of curved reflecting surfaces, which is made of a transparent body of a glass or the like. Formed in the order of passage of ray from the object R1 at a finite distance in the surfaces of the optical element 10-1 are a concave refracting surface (incident surface) R2, five reflecting surfaces including a concave mirror R3, a reflecting surface R4, a concave mirror R5, a reflecting surface R6, and a concave mirror R7, and a concave refracting surface (emergent surface) R8. R9 is the aperture stop. R10 is the final image plane, on which the image pickup surface of the image pickup device such as the CCD is located. Each of the optical element 10-1 and the aperture stop R9 constitutes an element of the optical system 10. This optical system is a so-called entrance-side telecentric optical system wherein the entrance pupil is at infinity. Numeral 11 designates the reference axis of the optical system.

The two refracting surfaces both are rotationally symmetric, spherical surfaces and all the reflecting surfaces are surfaces symmetric with respect to the YZ plane.

The imaging action in the present embodiment will be described. The beam from the object R1 enters the incident surface R2 of the optical element 10-1, is reflected by the surfaces R3 and R4, thereafter is focused once near the surface R4, then is reflected successively by the surfaces R5, R6, and R7, is emergent from the emergent surface R8, passes through the aperture R9, and thereafter is again focused on the final image plane R10.

As described, the optical element 10-1 functions as a lens unit having a positive refractive power as a whole having the desired optical performance by the refractive power of the incident and emergent surfaces and the plurality of curved reflectors therein.

The ray aberration diagrams of the optical system of the present embodiment are shown in FIGS. 14A–14F. In this embodiment only, the abscissa represents the object-side NA in the ray aberration diagrams.

In the present embodiment the incident surface R2 is such a concave surface that the object point and the center of curvature are on the same side in correspondence to the object at the finite distance ($s_2 = -10$), and the radius of curvature ($r_2 = -12.533$) is made nearly coincident with the object distance, thus achieving the value of the chromatic aberration correction condition E=0.20 and thereby effectively achieving correction for chromatic aberration. On the other hand, the emergent surface R8 is such a concave surface that the axial image point and the center of curvature are on the same side, and the radius of curvature ($r_8 = -18.546$) is made nearly coincident with the distance from the emergent surface to the image point ($s_8' = D_8 + D_9 = 11.95$), thus attaining E'=0.29 and thus effectively achieving correction for chromatic aberration.

Embodiment 6

Figure 15:
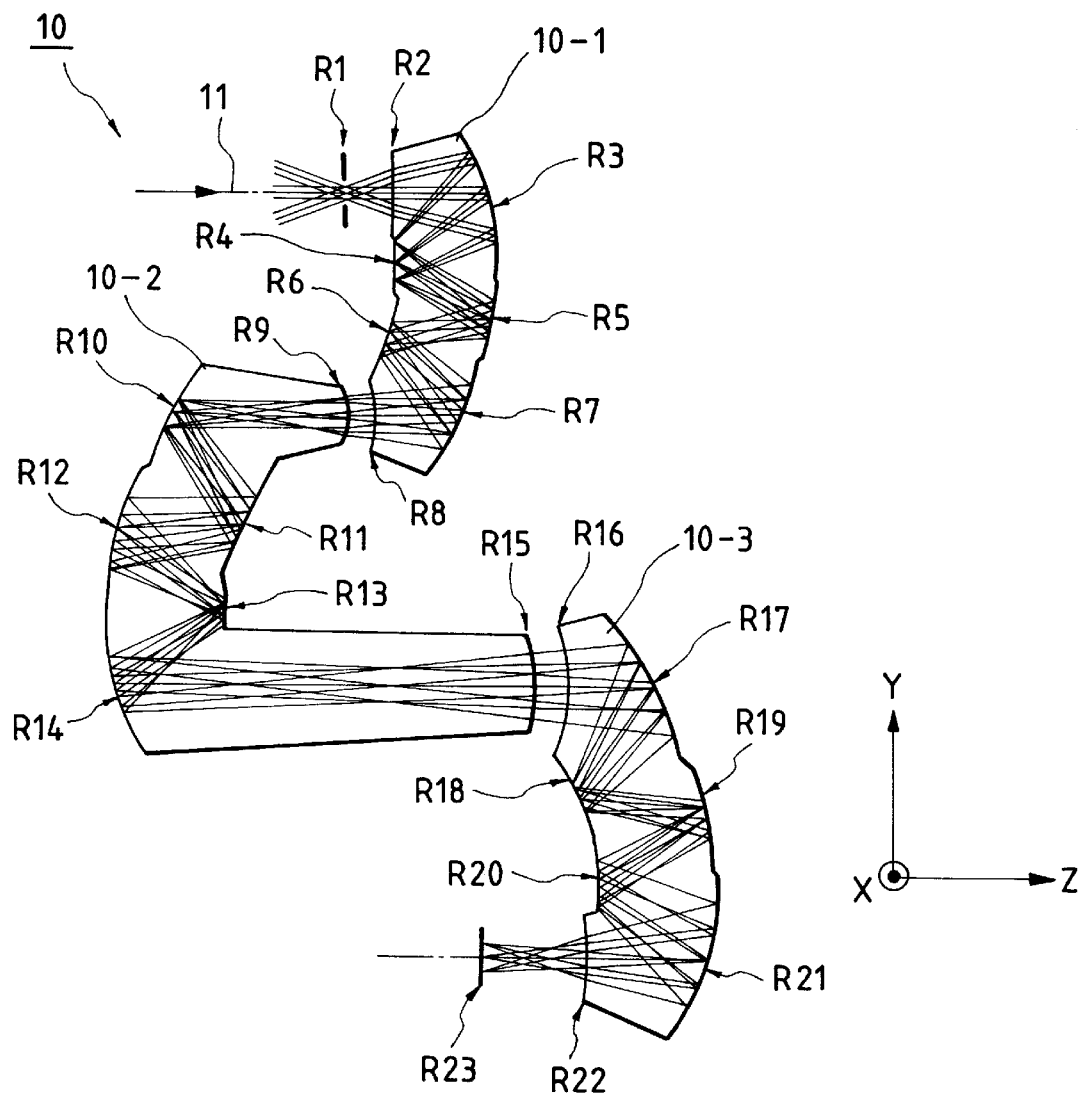
FIG. 15 is a cross-sectional view in the YZ plane of the optical system of Embodiment 6 according to the present invention.
Figure 16:
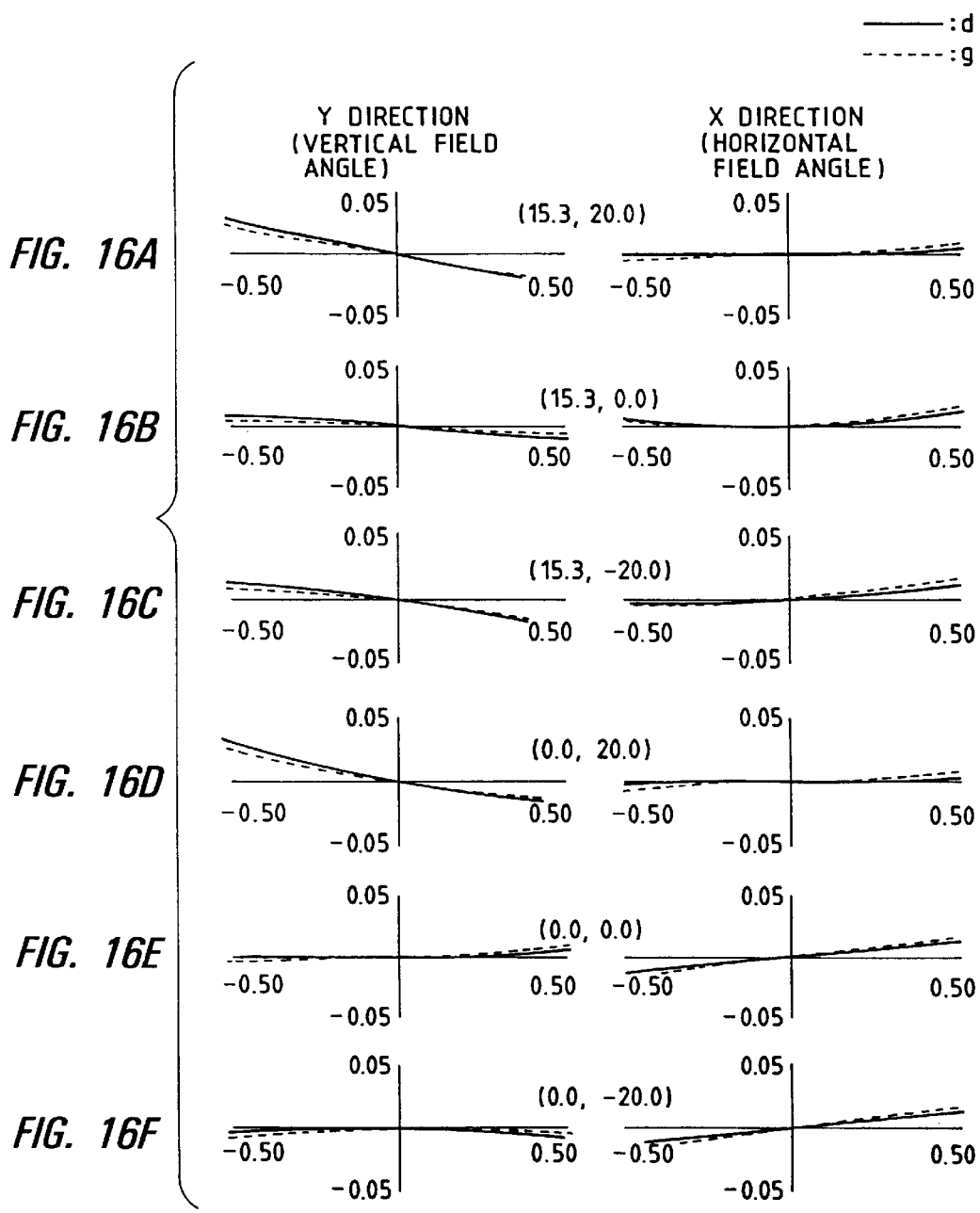
FIGS. 16A–16F are transverse aberration diagrams of Embodiment 6.
Figure 17:
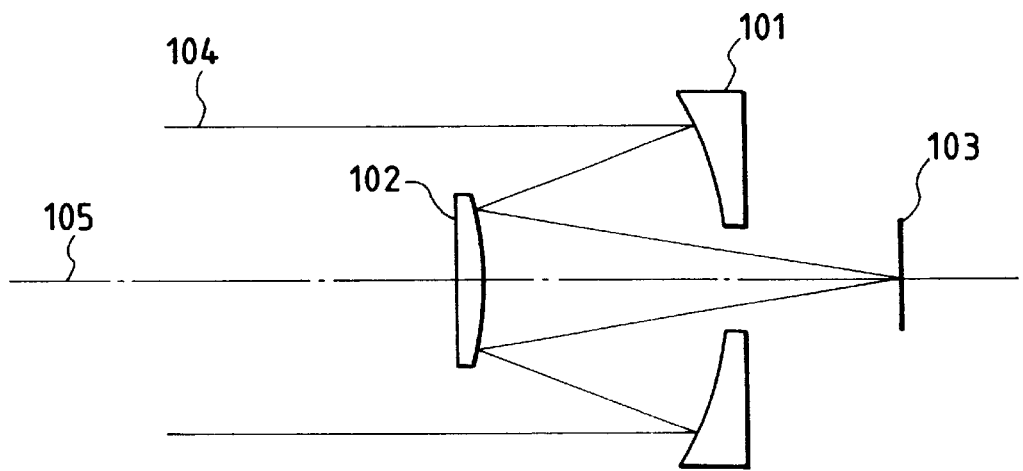
FIG. 17 is a drawing to show the basic structure of the Cassegrain reflection telescope.
Figure 18:
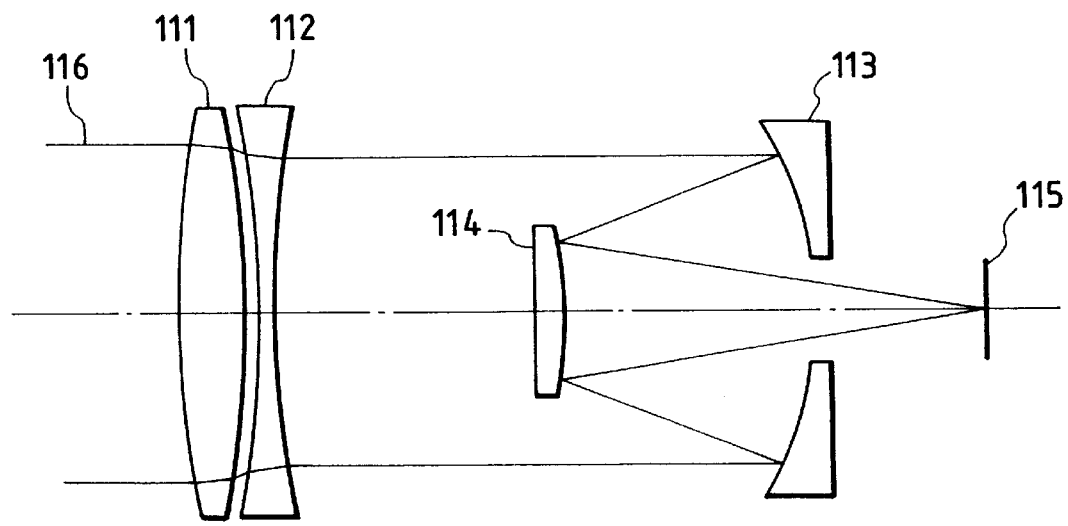
FIG. 18 is a drawing to show the basic structure of the catadioptric telescope.
Figure 19:
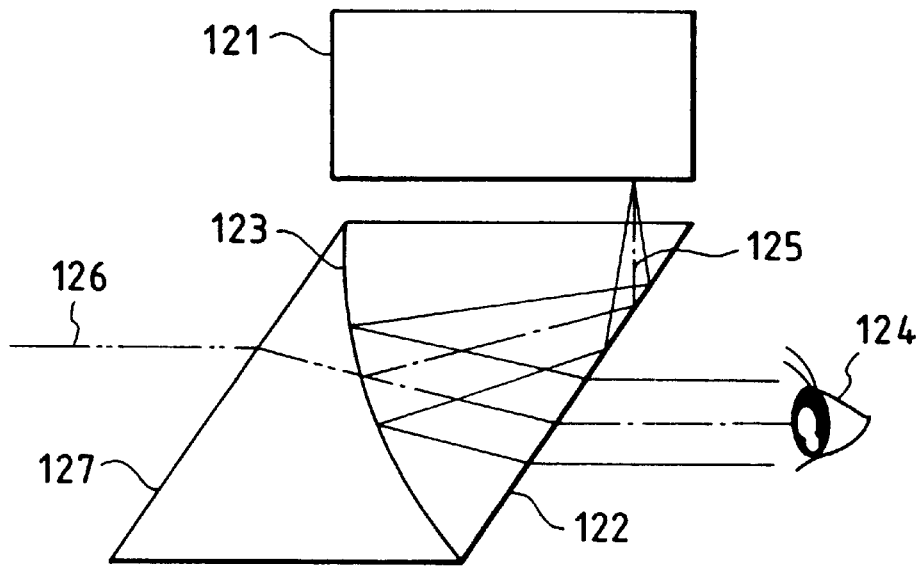
FIG. 19 is a structural drawing of the observing optical system with the prism reflecting surface having curvature.
Figure 20:
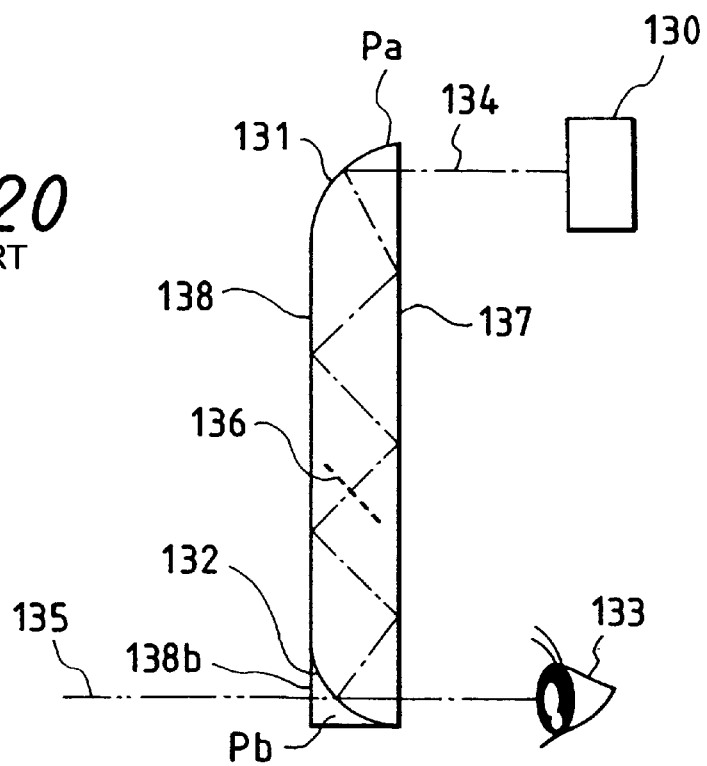
FIG. 20 is a structural drawing of another observing optical system with the prism reflecting surfaces having curvature.

FIG. 15 is a cross-sectional view in the YZ plane of the optical system according to Embodiment 6 of the present invention. The optical system of the present embodiment is comprised of the aperture stop and three optical elements 10-1, 10-2, 10-3. The present embodiment is a photographing optical system with the horizontal field angle 40.0° and the vertical field angle 30.6°. FIG. 15 also illustrates the optical paths. The constitutional data of the present embodiment is as follows.

| Horizontal half field angle | 20.0 |
|---|---|
| Vertical half field angle | 15.3 |
| Aperture size | 1.00 |
| Image size | 2.5 mm horizontal × 1.9 mm vertical |
| Reduced focal length f | 3.30 mm |

| i | Yi | Zi | θi | Di | Ndi | vdi | |
|---|---|---|---|---|---|---|---|
| 1 (10-1) | 0.00 | 0.00 | 0.00 | 4.00 | 1 | | aperture |
| 2 | 0.00 | 4.00 | 0.00 | 8.00 | 1.51633 | 64.15 | refracting surface |
| 3 | 0.00 | 12.00 | 18.00 | 9.72 | 1.51633 | 64.15 | reflecting surface |
| 4 | −5.71 | 4.14 | 3.00 | 9.33 | 1.51633 | 64.15 | reflecting surface |
| 5 | −10.38 | 12.22 | −10.00 | 8.84 | 1.51633 | 64.15 | reflecting surface |
| 6 | −11.91 | 3.52 | −18.00 | 8.91 | 1.51633 | 64.15 | reflecting surface |
| 7 | −18.32 | 9.70 | −23.00 | 6.98 | 1.51633 | 64.15 | reflecting surface |
| 8 | −18.32 | 2.73 | 0.00 | 2.27 | 1 | | refracting surface |

-continued

| i | Yi | Zi | θi | Di | Ndi | vdi | |
|---|---|---|---|---|---|---|---|
| (10-2) | | | | | | | |
| 9 | −18.32 | 0.46 | 0.00 | 15.00 | 1.51633 | 64.15 | refracting surface |
| 10 | −18.32 | −14.54 | −28.00 | 11.00 | 1.51633 | 64.15 | reflecting surface |
| 11 | −27.44 | −8.39 | −24.00 | 11.00 | 1.51633 | 64.15 | reflecting surface |
| 12 | −28.97 | −19.28 | −12.00 | 11.00 | 1.51633 | 64.15 | reflecting surface |
| 13 | −34.80 | −9.95 | 0.00 | 11.00 | 1.51633 | 64.15 | reflecting surface |
| 14 | −40.63 | −19.28 | 16.00 | 35.30 | 1.51633 | 64.15 | reflecting surface |
| 15 | −40.63 | 16.02 | 0.00 | 2.76 | 1 | | refracting surface |
| (10-3) | | | | | | | |
| 16 | −40.63 | 18.77 | 0.00 | 7.00 | 1.51633 | 64.15 | refracting surface |
| 17 | −40.63 | 25.77 | 28.00 | 11.00 | 1.51633 | 64.15 | reflecting surface |
| 18 | −49.75 | 19.62 | 24.00 | 11.00 | 1.51633 | 64.15 | reflecting surface |
| 19 | −51.28 | 30.52 | 12.00 | 11.00 | 1.51633 | 64.15 | reflecting surface |
| 20 | −57.11 | 21.19 | 0.00 | 11.00 | 1.51633 | 64.15 | reflecting surface |
| 21 | −62.94 | 30.52 | −16.00 | 10.00 | 1.51633 | 64.15 | reflecting surface |
| 22 | −62.94 | 20.52 | 0.00 | 8.69 | 1 | | refracting surface |
| 23 | −62.94 | 11.83 | 0.00 | | 1 | | image plane |

Shape of Spherical Surface
R2 surface $r_2 = -718.657$
R8 surface $r_8 = -8.427$
R9 surface $r_9 = -4.043$
R15 surface $r_{15} = -12.755$
R16 surface $r_{16} = -12.533$
R22 surface $r_{22} = -18.546$ Shape of Aspherical Surface
R3 surface $C_{02} = -3.26768\text{e-}02$ $C_{20} = -3.99255\text{e-}02$
$C_{03} = 2.30525\text{e-}05$ $C_{21} = -2.24196\text{e-}04$
$C_{04} = 1.28900\text{e-}07$ $C_{22} = -4.05503\text{e-}05$
$C_{40} = -2.43683\text{e-}05$
R4 surface $C_{02} = -2.29750\text{e-}02$ $C_{20} = -1.07533\text{e-}01$
$C_{03} = 2.03115\text{e-}03$ $C_{21} = -5.57239\text{e-}03$
$C_{04} = -2.27345\text{e-}04$ $C_{22} = -1.42335\text{e-}03$
$C_{40} = -1.12200\text{e-}03$
R5 surface $C_{02} = -1.90548\text{e-}02$ $C_{20} = -3.32535\text{e-}02$
$C_{03} = 7.44119\text{e-}04$ $C_{21} = -4.06775\text{e-}04$
$C_{04} = -4.58897\text{e-}06$ $C_{22} = -7.09493\text{e-}05$
$C_{40} = -6.28209\text{e-}05$
R6 surface $C_{02} = -3.99117\text{e-}03$ $C_{20} = -1.61346\text{e-}02$
$C_{03} = 6.91142\text{e-}04$ $C_{21} = -1.45068\text{e-}03$
$C_{04} = -1.15772\text{e-}04$ $C_{22} = -1.23744\text{e-}04$
$C_{40} = -1.26165\text{e-}04$
R7 surface $C_{02} = -2.30162\text{e-}02$ $C_{20} = -2.55168\text{e-}02$
$C_{03} = 2.32867\text{e-}04$ $C_{21} = -8.88810\text{e-}04$
$C_{04} = -6.40970\text{e-}05$ $C_{22} = -1.24550\text{e-}05$
$C_{40} = 1.01072\text{e-}05$
R10 surface $C_{02} = 2.17975\text{e-}02$ $C_{20} = 2.47466\text{e-}02$
$C_{03} = 9.97468\text{e-}05$ $C_{21} = 6.39996\text{e-}04$
$C_{04} = -4.72795\text{e-}05$ $C_{22} = -4.45879\text{e-}05$
$C_{40} = -2.17738\text{e-}05$
R11 surface $C_{02} = -1.04346\text{e-}03$ $C_{20} = 1.04628\text{e-}02$
$C_{03} = 1.21962\text{e-}03$ $C_{21} = 1.62194\text{e-}03$
$C_{04} = 9.87976\text{e-}05$ $C_{22} = 8.20826\text{e-}05$
$C_{40} = -2.13347\text{e-}05$
R12 surface $C_{02} = 2.57361\text{e-}02$ $C_{20} = 3.22622\text{e-}02$
$C_{03} = -5.94528\text{e-}05$ $C_{21} = -1.96348\text{e-}04$
$C_{04} = 2.82328\text{e-}05$ $C_{22} = 5.68232\text{e-}05$
$C_{40} = 3.16787\text{e-}05$
R13 surface $C_{02} = 1.83729\text{e-}02$ $C_{20} = -6.23117\text{e-}04$
$C_{03} = -2.49773\text{e-}03$ $C_{21} = -8.91999\text{e-}03$
$C_{04} = -4.47218\text{e-}04$ $C_{22} = -1.42817\text{e-}03$
$C_{40} = -1.19674\text{e-}03$
R14 surface $C_{02} = 2.78563\text{e-}02$ $C_{20} = 3.29901\text{e-}02$
$C_{03} = -1.99079\text{e-}04$ $C_{21} = -2.23795\text{e-}04$
$C_{04} = 3.24076\text{e-}05$ $C_{22} = 6.35580\text{e-}05$
$C_{40} = 3.28233\text{e-}05$
R17 surface $C_{02} = -2.11301\text{e-}02$ $C_{20} = -2.25191\text{e-}02$
$C_{03} = 7.85832\text{e-}05$ $C_{21} = 9.47005\text{e-}04$
$C_{04} = 7.74641\text{e-}07$ $C_{22} = -1.09338\text{e-}04$
$C_{40} = -2.28217\text{e-}05$
R18 surface $C_{02} = -6.84044\text{e-}03$ $C_{20} = -1.13100\text{e-}02$
$C_{03} = -1.36540\text{e-}03$ $C_{21} = -2.57167\text{e-}03$
$C_{04} = -1.89804\text{e-}04$ $C_{22} = 1.01870\text{e-}04$
$C_{40} = -3.74081\text{e-}05$
R19 surface $C_{02} = -2.75050\text{e-}02$ $C_{20} = -3.21814\text{e-}02$
$C_{03} = 3.57006\text{e-}06$ $C_{21} = 3.45061\text{e-}04$
$C_{04} = -2.73007\text{e-}05$ $C_{22} = -4.96141\text{e-}05$
$C_{40} = -2.77335\text{e-}05$
R20 surface $C_{02} = -1.57952\text{e-}02$ $C_{20} = -6.94429\text{e-}03$
$C_{03} = 1.30589\text{e-}03$ $C_{21} = -5.93952\text{e-}03$
$C_{04} = -2.59129\text{e-}04$ $C_{22} = 1.11449\text{e-}03$
$C_{40} = -1.19082\text{e-}04$
R21 surface $C_{02} = -2.63297\text{e-}02$ $C_{20} = -3.08134\text{e-}02$
$C_{03} = 2.34930\text{e-}04$ $C_{21} = 7.97596\text{e-}04$
$C_{04} = -3.55951\text{e-}05$ $C_{22} = -1.32532\text{e-}05$
$C_{40} = -2.97553\text{e-}05$ The optical system 10 of the present embodiment is comprised of the aperture stop R1 and three optical elements 10-1, 10-2, 10-3 and each optical element 10-1, 10-2, 10-3 is made of a transparent body of a glass or the like and has a plurality of curved reflecting surfaces.

Formed in the order of passage of ray from the object in the surfaces of the optical element 10-1 are a weak concave refracting surface (incident surface) R2, five reflecting surfaces including a concave mirror R3, a convex mirror R4, a concave mirror R5, a reflecting surface R6, and a concave mirror R7, and a concave refracting surface (emergent surface) R8.

Further, formed in the order of passage of ray from the object in the surfaces of the optical element 10-2 are a convex refracting surface (incident surface) R9, five reflecting surfaces including a concave mirror R10, a reflecting surface R11, a concave mirror R12, a reflecting surface R13, and a concave mirror R14, and a concave refracting surface (emergent surface) R15.

In addition, formed in the order of passage of ray from the object in the surfaces of the optical element 10-3 are a concave refracting surface (incident surface) R16, five reflecting surfaces including a concave mirror R17, a reflecting surface R18, a concave mirror R19, a reflecting surface R20, and a concave mirror R21, and a concave refracting surface (emergent surface) R22.

R1 is the aperture stop (the entrance pupil) disposed on the object side of the optical element 10 and R23 is the final image plane, on which the image pickup surface of the image pickup device such as the CCD is located. Numeral 11 designates the reference axis of the photographing optical system.

Both refracting surfaces of each optical element are rotationally symmetric, spherical surfaces and all the reflecting surfaces are surfaces symmetric with respect to the YZ plane.

The imaging action of the present embodiment will be described. The beam from the object is restricted in the quantity of incident light by the aperture (entrance pupil) R1, thereafter enters the incident surface R2 of the optical element 10-1, is reflected by the surface R3, thereafter is focused once near the surface R4, then is reflected successively by the surfaces R4, R5, R6, and R7, emerges from the emergent surface R8, and then is incident to the second optical element 10-2.

The beam incident to the incident surface R9 of the optical element 10-2 is once focused between the surfaces R9 and R10, is reflected successively by the surfaces R10, R11, R12, R13, and R14, during which it is once focused near the surface R13 and between the surfaces R13, R14, then is emergent from the emergent surface R15, and is incident to the third optical element 10-3.

The beam incident to the incident surface R16 of the optical element 10-3 is reflected by the surfaces R17, R18, thereafter is focused once near the surface R19, then is reflected successively by the surfaces R19, R20, and R21, is emergent from the emergent surface R22, and finally forms an image on the final image plane R23.

As described, the optical system 10 functions as a lens system having capability of forming image as a whole in the combination of the three optical elements having the desired refractive power and optical performance by the refractive power of the incident and emergent surfaces and the refractive power of the plurality of curved reflectors therein.

The ray aberration diagrams of the present embodiment are shown in FIGS. 16A–16F.

The present embodiment comprises the optical system excellent in the imaging performance as a whole in the combination of the three optical elements having the refractive power and, especially as to chromatic aberration, it is corrected for in each unit of optical element, similarly as in the other embodiments.

In the optical element 10-1, similarly as in Embodiment 1, the incident surface R2 is the weak concave surface close to the flat surface in correspondence to the infinite object to near object and the radius of curvature $r_2=-718.657$ is made nearly coincident with the object distance, thus attaining the value of the chromatic aberration correction condition $E_1=0.00$. The emergent surface R8 is such a concave surface that the image point of the axial rays emerging from the optical element 10-1 and the center of curvature are on the same side and the radius of curvature $r_8=-8.427$ is made nearly coincident to the distance from the emergent surface to the image point $s_8'=5.17$, thus attaining the value of the chromatic aberration correction condition $E_1'=0.25$ and thus effectively achieving correction for chromatic aberration.

On the other hand, in the second optical element 10-2, considering the axial image point (virtual image) of the optical element 10-1 as the object point, the incident surface R9 is such a convex surface that the center of curvature thereof and the object point are set on the same side and the radius of curvature $r_9=-4.043$ is made nearly coincident with the distance from the incident surface to the object point $s_9=2.90$, thus attaining the value of the chromatic aberration correction condition $E_2=0.32$. The emergent surface R15 is such a convex surface that the axial virtual image point and the curvature center are set on the same side and the radius of curvature $r_{15}=-12.755$ is made nearly coincident with the distance from the emergent surface to the virtual image point $s_{15}'=11.61$, thus attaining the value of the chromatic aberration correction condition $E_2'=0.03$ and thus effectively achieving correction for chromatic aberration.

In the third optical element 10-3, similarly as in Embodiment 5, the incident surface R16 is such a concave surface that the object point and the curvature center are on the same side in correspondence to the object at a finite distance formed by the axial rays emerging from the optical element 10-2 and the radius of curvature $r_{16}=-12.533$ is made nearly coincident with the distance from the incident surface to the object point $s_{16}=8.85$, thus attaining the value of the chromatic aberration correction condition $E_3=0.11$. On the other hand, the emergent surface R22 is also such a concave surface that the image point and the curvature center are on the same side and the radius of curvature $r_{22}=-18.546$ is made nearly coincident with the distance from the emergent surface to the image point $s_{22}'=8.69$, thus attaining the value of the chromatic aberration correction condition $E_3'=0.20$ and thus effectively achieving correction for chromatic aberration.

As described above, the present embodiment is effectively corrected for aberration as a total system in the combination of the three optical elements each corrected for chromatic aberration alone.

The above embodiments each showed the examples wherein the incident surface and emergent surface were the spherical or flat surfaces, but, in any optical elements using general curved surfaces such as aspherical surfaces or anamorphic surfaces made based on spherical surfaces, chromatic aberration can also be effectively corrected for as long as the optical systems are set so as to satisfy the aforementioned conditions.

Here, the values of chromatic aberration correction conditions E, E' are indicated for each group in each embodiment.

|  | 1st Group | | 2nd Group | | 3rd Group | |
| --- | --- | --- | --- | --- | --- | --- |
|  | In surf | Out surf | In surf | Out surf | In surf | Out surf |
| Embodiment 1 | 0.00 | 0.00 |  |  |  |  |
| Embodiment 2 | 0.00 | 0.18 |  |  |  |  |
| Embodiment 3 | 0.01 | 0.05 | 0.03 | 0.00 |  |  |
| Embodiment 4 | 0.01 | 0.41 | 0.53 | 0.01 |  |  |
| Embodiment 5 | 0.20 | 0.29 |  |  |  |  |
| Embodiment 6 | 0.00 | 0.25 | 0.32 | 0.03 | 0.11 | 0.20 |

In the present invention the value of the above chromatic aberration correction condition E, E' requires ideally 0, but the effect of chromatic correction can be attained if this value is smaller than 0.7. If this value is greater than 0.7, correction for chromatic aberration is not sufficient and the imaging performance is degraded. In the present specification, "the radius of curvature of the incident surface is set nearly equal to the distance from the vertex of the incident surface to the object on the reference axis" means that the value is set in the range of $0 \leq E \leq 0.7$, and "the radius of curvature of the emergent surface is set nearly equal to the distance from the vertex of the emergent surface to the image on the reference axis" means that the value is set in the range of $0 \leq E' \leq 0.7$.

Each of Embodiments 1 to 6 showed the embodiment of the reflecting optical system, but a compact or thin image pickup apparatus can be constructed by setting the image pickup surface of the image pickup medium (the CCD, for example) on the final image plane of each embodiment and forming the image of the object thereon.

In addition, if the final image is formed at infinity, the optical system may function as a compact or thin observing optical system. In this case the emergent surface is desirably a nearly flat surface, of course.

By the above structure, the present invention achieves the reflecting optical system and the image pickup apparatus using it, which is arranged in such a manner that, in picking up an image using the optical element with a plurality of internally reflecting surfaces of curved or flat surfaces integrally formed in the transparent body, curvatures of the incident surface or/and the emergent surface of optical element and the object position or/and image point position are properly set to well correct the various aberrations of the total system, especially to correct chromatic aberration at a high level, thus improving the imaging performance.

In particular, the invention achieves the reflecting optical system of high performance and the image pickup apparatus using it, which is arranged in such a manner that, in forming an image using the optical element provided with the incident surface of light and the emergent surface different from the incident surface, and the reflecting surfaces of internal reflection comprised of curved surfaces in the surfaces of the transparent body by making the beam from the object incident into the transparent body through the incident surface and making the beam reflected by the reflecting surfaces and emerging from the emergent surface, the elements are set so that the center of curvature of the incident surface and the object point are set on the same side with respect to the incident surface and the radius of curvature of the incident surface is made nearly equal to the distance from the vertex of the incident surface to the object point on the reference axis, and/or, so that the center of curvature of the emergent surface and the image are set on the same side with respect to the emergent surface and the radius of curvature of the emergent surface is made nearly equal to the distance from the vertex of the emergent surface to the image on the reference axis, whereby the axial chromatic aberration and lateral chromatic aberration occurring at the incident and emergent surfaces are effectively corrected for.

In addition, the present invention can achieve the reflecting optical system and the image pickup apparatus using it having at least one of the following advantages.

(2-1) When the beam incident through the incident surface is arranged to form an intermediate image inside the optical element, the oblique principal rays passing the aperture R1 can be converged before expanding too much, and therefore, the optical system can be made thinner.

(2-2) Chromatic aberration can be effectively corrected for by properly determining the configurations of the incident surface and emergent surface, depending upon whether the incident beam or the emergent beam is a diverging beam or a converging beam.

(2-3) Chromatic aberration can be effectively corrected for by properly determining the configurations of the incident surface and emergent surface, depending upon whether the object point is on the entrance side or on the exit side with respect to the incident surface and depending upon whether the image point is on the entrance side or on the exit side with respect to the emergent surface.

(2-4) Deviation of correction for chromatic aberration can be decreased for near objects, by forming the incident surface as a weak concave surface in correspondence to the far object to near object.

(2-5) The optical system can be applied to various optical systems because the conditions of chromatic aberration correction hold even if the object point and image point are switched from each other.

(2-6) When an optical system is constructed of a combination of plural optical elements each corrected for chromatic aberration singly, it is also very easy to correct chromatic aberration in achieving a wide angle arrangement, a high performance arrangement, or a partial focusing arrangement by the multi-group structure.

What is claimed is:

1. A reflecting optical system comprising:

a transparent member including a curved light incident surface, a curved reflecting surface having an aspherical shape, and a light emergent surface along a reference axis, wherein light entering said transparent member from said incident surface is reflected by said curved reflecting surface, and thereafter is emergent from said transparent member through said light emergent surface, and wherein the center of curvature of said light incident surface exists in an object side with respect to said light incident surface, and said light incident surface has a radius of curvature nearly equal to a distance from said light incident surface to the object along the reference axis so as to substantially suppress occurrence of chromatic aberration caused by refraction of a light beam at said light incident surface, wherein said curved reflecting surface is placed decentered relative to said light incident surface.

2. A reflecting optical system comprising:

a transparent member including a curved light incident surface, a curved reflecting surface having an aspherical shape, and a light emergent surface along a reference axis, wherein light entering said transparent member from said incident surface is reflected by said curved reflecting surface, and thereafter is emergent from said transparent member through said light emergent surface, and wherein the center of curvature of said light incident surface exists in an object side with respect to said light incident surface, and said light incident surface has a radius of curvature nearly equal to a distance from said light incident surface to the object along the reference axis so as to substantially suppress occurrence of chromatic aberration caused by refraction of a light beam at said light incident surface, wherein the object is an image formed on a light exit side of said light incident surface by another optical member and said light incident surface is a convex surface.

3. A reflecting optical system comprising:

a transparent member including a light incident surface, a curved reflecting surface having an aspherical shape and a curved light emergent surface along a reference axis, wherein light entering said transparent member from said light incident surface is reflected by said curved reflecting surface and thereafter is emergent from said transparent member through said light emergent surface, and wherein a center of curvature of said light emergent surface exists in an image side with respect to said light emergent surface, and said light emergent surface has a radius of curvature nearly equal to a distance from said emergent surface to the image along the reference axis so as to substantially suppress occurrence of chromatic aberration caused by refraction of a light beam at the light emergent surface, wherein said curved reflecting surface is placed decentered relative to said light incident surface.

* * * * *

UNITED STATES PATENT AND TRADEMARK OFFICE
CERTIFICATE OF CORRECTION

PATENT NO.    : 6,549,332 B2
DATED         : April 15, 2003
INVENTOR(S)   : Kenichi Kimura It is certified that error appears in the above-identified patent and that said Letters Patent is hereby corrected as shown below:

<u>Title page,</u>
Item [56], U.S. PATENT DOCUMENTS, insert -- 4,331,390   05/1982   Shafer --.

<u>Column 1,</u>
Line 44, "then" should read -- and then --.

<u>Column 15,</u>
Line 28, "all sits in the plane of" should read -- are in the plane of the --.

<u>Column 17,</u>
Line 42, "$C_{21}$" should read -- $C_{21}=$ --.

Signed and Sealed this

Twenty-first Day of October, 2003

JAMES E. ROGAN
*Director of the United States Patent and Trademark Office*